US012778172B2

(12) United States Patent
Samish et al.

(10) Patent No.: US 12,778,172 B2
(45) Date of Patent: Nov. 3, 2026

(54) TASTE-IMPROVING COMPOSITIONS AND USES THEREOF

(71) Applicants: AMAI PROTEINS LTD., Rehovot (IL); TECHNION RESEARCH & DEVELOPMENT FOUNDATION LIMITED, Haifa (IL)

(72) Inventors: Ilan Samish, Ness-Ziona (IL); Inbar Zuker, Ness-Ziona (IL); Shmuel Marko, Doar-Na Lev HaSharon (IL); Yoav Livney, Haifa (IL); Evgeniya Goldman, Haifa (IL); Ravit Edelman, Haifa (IL); Prerna Balkrishna Pawar, Haifa (IL); Samaa Alasibi, Haifa (IL)

(73) Assignees: AMAI PROTEINS LTD., Rehovot (IL); TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 485 days.

(21) Appl. No.: 18/270,329

(22) PCT Filed: Dec. 30, 2021

(86) PCT No.: PCT/IL2021/051555
§ 371 (c)(1),
(2) Date: Jun. 29, 2023

(87) PCT Pub. No.: WO2022/144892
PCT Pub. Date: Jul. 7, 2022

(65) Prior Publication Data

US 2024/0114943 A1 Apr. 11, 2024

Related U.S. Application Data

(60) Provisional application No. 63/132,160, filed on Dec. 30, 2020.

(51) Int. Cl.
*A23L 27/00* (2016.01)
*A23L 2/60* (2006.01)
*A23L 27/20* (2016.01)
*A23L 27/21* (2016.01)
*A23L 27/30* (2016.01)

(52) U.S. Cl.
CPC ................. *A23L 27/88* (2016.08); *A23L 2/60* (2013.01); *A23L 27/204* (2016.08); *A23L 27/21* (2016.08); *A23L 27/31* (2016.08); *A23L 27/72* (2016.08)

(58) Field of Classification Search
CPC .......... A23L 27/88; A23L 2/60; A23L 27/204; A23L 27/21; A23L 27/31; A23L 27/72; A23L 2/66; A23L 33/18; C07K 14/43; A23G 3/48
See application file for complete search history.

(56) References Cited

U.S. PATENT DOCUMENTS

| | | | |
|---|---|---|---|
| 2019/0343155 | A1 | 11/2019 | Shi et al. |
| 2019/0373921 | A1 | 12/2019 | Delattre et al. |

FOREIGN PATENT DOCUMENTS

| | | | | |
|---|---|---|---|---|
| GB | 2123672 A | 2/1984 | | |
| WO | 1984/02450 A1 | 7/1984 | | |
| WO | 2012/107205 A1 | 8/2012 | | |
| WO | WO-2014153000 A1 * | 9/2014 | ............... | A23L 2/60 |
| WO | 2019/215730 A1 | 11/2019 | | |
| WO | 2019/224381 A1 | 11/2019 | | |

OTHER PUBLICATIONS

Chen et al. Biotechnol Lett (2011) 33:721-725. (Year: 2011).*
Stanhope, "Sugar consumption, metabolic disease and obesity: The state of the controversy", Crit Rev Clin Lab Sci., 2016, vol. 53, No. 1, pp. 52-67.
Popkin et al., "The sweetening of the global diet, particularly beverages: patterns, trends and policy responses for diabetes prevention", Lancet Diabetes Endocrinol., 2016, vol. 4, No. 2, pp. 174-186.
Piernas et al., "Trends in purchases and intake of foods and beverages containing caloric and low-calorie sweeteners over the last decade in the U.S", Pediatr Obes., 2013, vol. 8, No. 4, pp. 294-306.
Suez et al., "Artificial sweeteners induce glucose intolerance by altering the gut microbiota", Nature, 2014, vol. 514, pp. 181-186.
Johnson et al., "Low-Calorie Sweetened Beverages and Cardiometabolic Health A Science Advisory From the American Heart Association", Circulation, 2018, vol. 138, No. 9; e126-e140, 34 pages.
GenBank Entry No. P02883, Jun. 2023.
GenBank Entry No. P02884, Feb. 2023.
GenBank Entry No. P02881, Feb. 2023.
GenBank Entry No. P02882, Feb. 2023.
GenBank Entry No. P13087, Feb. 2023.
GenBank Entry No. P19667, May 2023.
GenBank Entry No. Q6F495, May 2023.
GenBank Entry No. P56552, Sep. 2023.
GenBank Entry No. P80351, May 2023.
GenBank Entry No. P30233, May 2023.
GenBank Entry No. P80352, May 2023.
GenBank Entry No. P80353, May 2023.
GenBank Entry No. B9SA35, Mar. 2009.
International Search Report and Written Opinion issued in PCT/IL2021/051555 dated Feb. 22, 2022.
Weihrauch et al., "Artificial sweeteners—Do they have carcinogenic potential?", Medizinische Klinik, 2001, vol. 96, No. 11, pp. 670-675 (with English translation).

(Continued)

*Primary Examiner* — Erik Kashnikow
*Assistant Examiner* — Janice Y Silverman
(74) *Attorney, Agent, or Firm* — The Roy Gross Law Firm, LLC; Roy D. Gross

(57) ABSTRACT

The present invention relates to functional taste-improving composition comprising at least one taste-modifying protein (TMP), e.g., a sweet protein (SP) and at least one micro-patching (MP) agent; and to uses thereof in the food and beverage industry.

15 Claims, 12 Drawing Sheets

Specification includes a Sequence Listing.

(56) References Cited

OTHER PUBLICATIONS

Esposito et al., "The Importance of Electrostatic Potential in the Interaction of Sweet Proteins with the Sweet Taste Receptor", Journal of Molecular Biology, 2006, vol. 360, No. 2, pp. 448-456.
Kurihara, "Characteristics of antisweet substances, sweet proteins, and sweetness-inducing proteins", Critical Reviews In Food Science and Nutrition, 1992, vol. 32, No. 3, pp. 231-252.

* cited by examiner

TASTE-IMPROVING COMPOSITIONS AND USES THEREOF

CROSS-REFERENCE TO RELATED APPLICATIONS

This application is a U.S. National Phase of International Patent Application No. PCT/IL2021/051555, filed on Dec. 30, 2021, which claims priority to U.S. Provisional Application No. 63/132,160, filed Dec. 30, 2020. The entire contents of these applications are incorporated herein by reference in their entirety.

FIELD OF THE INVENTION

The present invention relates to taste-improving compositions and food or beverage products comprising the same.

BACKGROUND OF THE INVENTION

The high level of sugar in consumer-packaged food or beverage products is a significant concern for health organizations and consumers due to the increased prevalence of the metabolic syndrome including manifestations such as diabetes, obesity, tooth decay, cancer, mental disease and other ailments associated with sugar overconsumption. While the role of sugars in obesity is complex (Stanhope 2016, Crit Rev Clin Lab Sci. 53(1):52-67), health authorities and governments are seeking to reduce the sugar content in processed foods as soon as possible (Popkin and Hawkes 2016, Lancet Diabetes February; 4(2):174-86). The World Health Organization (WHO) has recommended that sugar intake should be less than 10% of total energy intake (WHO 2015), and a significant proportion of consumers are actively looking for low/reduced sugar alternatives (Piernas, Ng and Popkin 2013 Pediatr Obes. August; 8(4):294-306). Additionally, consumers are demanding products with an attractive sensory profile. Indeed, numerous countries have adopted sugar-related labeling and tax to reduce sugar over-consumption. Food scientists have responded to this demand by developing alternative sweetening strategies. This problem is technically challenging because sugar has a unique sensory profile that is difficult to reproduce and plays an essential role in the structure, texture, flavor enhancement, mouthfeel and preservation of the product.

There is an urgent global need for a healthy sweetening alternative for food and beverage products with optimal sensory properties and good stability to compete successfully in the global market. Artificial high-intensity sweeteners (HIS), such as Saccharin, Aspartame, Cyclamate, and Acesulfame K, Sucralose, Neotame, Advantame are used worldwide as low-calorie sweeteners for patients suffering from sugar-related illnesses such as diabetes, hyperlipidemia, metabolic syndrome, etc. HIS have various side effects, e.g., these zero-calorie sweeteners have been reported to interact with the microbiome and to cause obesity and a pre-diabetic condition (Suez et al., 2014, Nature volume 514, pages 181-180, even if to a lesser extent than sugar. The American Heart Association published an advisory against HIS claiming that there is "a dearth of evidence for adverse health effects" ((Johnson et al., 2018, Circulation, Vol. 138, No. 9). In this advisory, all HIS, natural (steviol glycosides and monk fruit) and artificial were put under the same scrutiny. Complementary, low-intensity sweeteners (LIS), namely rare sugars and polyols (e.g., xylitol, mannitol, allulose, etc.), are associated with high costs, and are not fully digested by the human body, which limits their use to avoid bloating, diarrhea, and other adverse gastrointestinal effects. Thus, currently, there is no good sugar substitute that enables significant (>30%) sugar reduction and fully addresses taste, health, cost, and product fitness.

Sweet proteins (SP) have the potential to replace HIS by providing natural, palatable, low-calorie sweeteners, with no glycemic index, since proteins do not cause insulin demand, unlike sucrose (Weihrauch 2001 and Cohen 2001). SP are found in exotic fruits and are 700-3,000 times sweeter than sugar. These healthy sweeteners bind to sweet receptors like sugar and are then digested as other proteins. They are expected to have a zero glycemic index, ~0 calories, and no adverse effects on our health or microbiome. Thaumatin is currently the only globally approved sweet protein used in the market. Due to price, supply and sensory profile, it is generally not applied as a significant (>30%) sugar-reduction solution. Thus, while these are Taste Modifying Protein (TMP) they are de facto not utilized as significant sugar reduction agents. Other than thaumatin, SPs have not entered the mass food market due to high cost and limited supply, low stability, short shelf life, especially in a fatty environment, and lingering taste. The stability and sensory profile challenges are affected by local hydrophobic-, polar- or ionic patches on the surface of proteins, including SP, resulting in SP adhering to each other (decreasing shelf life), to hydrophobic substances found in the food, or to hydrophobic-, polar- or ionic patches of other proteins on the tongue and the oral cavity (causing a lingering taste). Complementary, such effects may be caused from local charged patches of opposite charges. Currently, there are no adequate solutions to this problem. Therefore, there is a need to develop compositions and methods to overcome one or more of the aforementioned problems.

GB2123672 describes sweet proteins, such as Thaumatin and Monellin, and an incorporated weakly acidic polysaccharide gum, optionally together with a food acid or bulking agent, in various beverages, mouthwashes, or as a pharmaceutical base.

WO8402450 describes the application of Thaumatin or Monellin to a chewing gum composition comprising gum base, sweetener, and flavoring.

WO2019215730 discloses modified proteins with improved food-related properties.

SUMMARY OF THE INVENTION

According to some aspects of the present invention, small amphiphiles can be used to modify the sweetness profile of sweet proteins and to shorten the lingering taste.

Micropatching (MP) agents are small natural amphiphilic molecules, surfactants, and hydrotropes (e.g., epigallocatechin-3-gallate (EGCG) and other polyphenols including catechins and tannins; saponins, e.g. from *Quillaja* or *yucca*; phospholipids like lecithin and phosphatidic acid; free fatty acids; mono and diglycerides; glycolipids like rhamnolipids; lipopeptides; and glycosides of hydrophobic molecules, (e.g. rutin, polydatin); amphiphilic preservatives, (e.g. sorbates), small sweet amphiphiles (e.g. glycyrrhizinate, steviol glycosides, sugars), and amphiphilic sweet-taste suppressors (anti-sweet agents (ASA), e.g. gymnemic acid, lactisole, ziziphin, hodulcine, or zinc salts), which may interact with proteins (either TMP, food proteins, taste receptors, mucins, or other proteins in the oral cavity) by adsorbing to their hydrophobic patches. These MP agents are dissolved in water or an aqueous solution (e.g., citric acid, phosphoric acid, and/or cryoprotectants, like sucrose, maltodextrin, etc.), in ethanol, or dissolved directly into the SP solution. The MP agent is mixed at different ratios with the SP and stirred to equilibrate the system.

The present invention is based, in part, on the finding that the micropatching approach improves the performance of TMP. It may improve their sensory profile, and increase their stability through processing and shelf life, The MP-TMP resulting complex may have an improved sensory profile compared to pure TMP (more similar to that of sugar than the pure TMP). The use of the micropatching agents may shorten lingering taste or aftertaste of sweet proteins. The MPs may improve the sensory profile of the TMP without introducing undesired off-flavors, enabling more extensive sugar replacement.

In accordance with some aspects, the present disclosure provides a functional taste-improving composition comprising at least one taste-modifying protein (TMP) and at least one micropatching (MP) agent.

According to some embodiments, the composition may include a complex wherein the TMP and the MP exhibit weak non-covalent interactions between the TMP and the MP.

According to some embodiments, the at least one MP agent has a molecular weight of less than or equal to 1 kDa. According to some embodiments, the at least one MP agent interacts with the at least one TMP. According to some embodiments, the at least one MP agent interacts with at least one sweet taste receptor.

According to some embodiments, the at least one MP agent is selected from the group consisting of polyphenols, saponins, phospholipids, free fatty acids, monoglycerides, diglycerides, glycolipids, lipopeptides, amphiphilic preservatives, glycosides of hydrophobic molecules, amphiphilic sweeteners (including sugars, glycyrrhizinate, steviol glycosides), amphiphilic anti-sweet agents (ASA), and mixtures thereof.

According to some embodiments, said polyphenols are selected from the group consisting of catechins, and tannins. According to some embodiments, said saponins are originated from *Quillaja* or *yucca*. According to some embodiments, said phospholipids are lecithin or phosphatidic acid. According to some embodiments, said glycosides of hydrophobic molecules are rutin, or polydatin. According to some embodiments, said amphiphilic preservatives are sorbates.

According to some embodiments, the at least one MP agent is selected from the group consisting of epigallocatechin-3-gallate (EGCG), gymnemic acid, lactisole, ziziphin, hodulcine, licorice extract, licorice glycyrrhizinates, ammonium glycyrrhizinate, glycyrrhizic acid, ammoniated glycyrrhizin, dipotassium glycyrrhizinate, monoammonium glycyrrhizinate (MAG), stearyl glycyrrhizinate, chlorogenic acid, potassium chlorogenate, caffeic acid, cynarine, tannic acid, cinnamic acid, coumaric acid, ferulic acid, sinapic acid, maltodextrin, cyclodextrin, and mixtures thereof.

According to some embodiments, the at least one MP agent is encapsulated, entrapped, or coated partially or fully. According to some embodiments, the at least one MP agent is released during oral processing.

According to some embodiments, the at least one MP agent is selected from the group consisting of a sweet taste suppressor, an anti-sweet agent (ASA), a flavor modulator, and a sweetener. According to some embodiments, the encapsulating, entrapping or coating food compound material is selected from a group consisting of maltodextrin, cyclodextrin and any food compound which binds to the anti-sweet agent (ASA). According to some embodiments, the food compound electrostatically binds to the ASA at a pH<6.2, and is repulsed from the ASA at a pH range of about 6.2 to about 7.6.

According to some embodiments, the food compound electrostatically binds to the ASA with a melting point ranging from about 25° C. to about 35° C.

According to some embodiments, the at least one TMP is selected from the group consisting of monellin, MNEI, thaumatin, miraculin, curculin, brazzein, mabinlin, or a fragment or variant thereof.

According to some embodiments, the at least one TMP comprises an amino acid sequence having between 40% to 99% identity with the amino acid sequence of a TMP selected from the group consisting of modified monellin, MNEI, thaumatin, miraculin, curculin, brazzein, and mabinlin.

According to some embodiments, the modified MNEI comprises an amino acid sequence selected from the group consisting of SEQ ID NOs:1-27, or a fragment or variant thereof.

According to some embodiments, the functional MP-TMP composition has at least one improved food-related property compared with the TMP alone.

According to some embodiments, the at least one improved food-related property is selected from the group consisting of improved sweetness-time-profile, shortened sweet taste onset, shorter lingering sweetness, improved sweetness potency, improved sweetness character, increased thermal, increased pH stability, increased solubility, increased high-pressure stability, increased salt stability, increased stability in a fatty milieu, a sensory profile that is closer to that of sugar and increased shelf-life stability in dry form or in the final product. In this context, stability may be short term stability (e.g. heat treatment such as during pasteurization) or long-term stability e.g. shelf life.

According to some embodiments, the functional taste-improving composition, comprises, in addition to the SP, an encapsulated (coated or entrapped) MP, or sweet-taste modulator (e.g. an ASA), which is released upon oral processing (triggered release, activated release), thereby suppressing only the lingering taste without significantly suppressing the maximal sweetness. The release may be triggered by enzymes (e.g. amylases) or any other components found in the saliva, or by temperature shift, or by pH shift, or any other "step-change" occurring upon ingestion or oral processing of the food or beverage.

According to some embodiments the encapsulation of the MP, sweet-taste modulator; or ASA, may be achieved by maltodextrin, cyclodextrin, or a lipid with a melting point (or liquid-crystalline to liquid transition) between 25-35 degrees centigrade, or any compound which ionizes and disassembles or dissociates, or dissolves upon a change in pH to the pH of the saliva (i.e. from a lower or higher pH, into the range of 6.2-7.6).

According to some embodiments, the functional taste-improving composition, or any combination thereof, is used in preparing a product for oral delivery.

According to some embodiments, the product is a food or beverage product, a dietary supplement product, or a medicament.

According to some embodiments, the functional taste-improving composition is used as a sweetener.

According to some embodiments, the composition has a reduced sweet lingering aspect compared to that of the TMP without the low molecular weight MP agent.

In accordance with some aspects, the present disclosure provides a food or beverage product comprising the functional taste-improving composition of the present invention.

According to some embodiments, the food or beverage product comprises at least one food ingredient. According to some embodiments, the food ingredient is at least one of artificial or natural flavor, food additive, food coloring, preservative, bulking agents or sugar additive.

According to some embodiments, the food ingredient is selected from the group consisting of *stevia* (including steviol glycosides), sucrose (including the monomer constituents of the sucrose disaccharide i.e. fructose and glucose or other monosaccharides), agave nectar, brown rice syrup, fruit sugar (e.g. sugar from dates, apples etc), honey, maple syrup, molasses, monk fruit, sugar alcohols, rare sugars, aspartame, sucralose, acesulfame potassium (also known as acesulfame K), saccharin, aspartame, cyclamate, sucralose, neotame, advantame, and dietary fibers.

According to some embodiments, the food or beverage product has low glycemic effects and is in the form of liquid, semi-solid, or solid foodstuffs.

In accordance with some aspects, the present disclosure provides a method for improving the flavor or reducing sweet-taste-lingering of beverage or solid foodstuffs, comprising adding a sufficient amount of the functional taste-improving composition to the beverage or solid foodstuffs.

According to some embodiments, the functional taste-improving composition has low glycemic effects and is in the form of liquid, semi-solid, or solid foodstuffs. According to some embodiments, the composition has a reduced sweet lingering aspect than that of the TMP without the MP agent.

In accordance with some aspects, the present disclosure provides a method for improving the flavor or masking the lingering aftertaste of beverage or solid foodstuffs, comprising adding a sufficient amount of the composition of the present invention to the beverage or solid foodstuffs.

BRIEF DESCRIPTION OF THE DRAWINGS

To better understand the subject matter disclosed herein, and to exemplify how it may be carried out in practice, embodiments will now be described, by way of a non-limiting example only, with reference to the accompanying drawings, in which results of experiments in which complete sugar substitution was performed (partial sugar replacement results in even better sugar-resemblance).

DETAILED DESCRIPTION OF THE INVENTION

Figure 1:
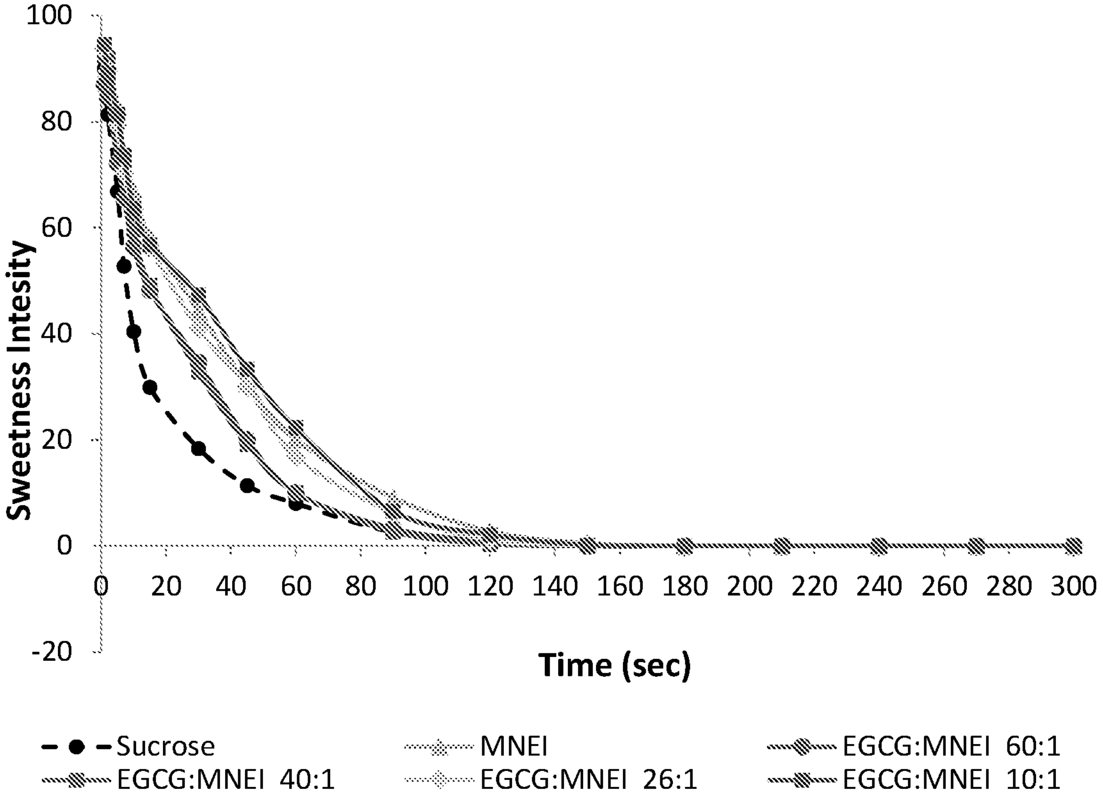
FIG. 1 demonstrates the effect of a MP agent, EGCG at several MP:SP ratios with MNEI, compared to MNEI alone and to sucrose, at 8 Bx (sugar equivalence sweetness level), on the sweetness profile over time as measured by sweetness intensity. The results exhibit a decrease in the lingering taste upon addition of the MP agent in certain MP:SP ratios.

Artificial and natural low-calorie sweeteners are readily available in the market, yet some have known undesired health-compromising effects. Thus, there is a significant need for replacements for the currently available low-calorie sweeteners that will provide both an optimal sensory profile and be suitable for food and beverage products.

The present disclosure relates to novel functional taste-improving compositions.

Surprisingly, the inventors have found that small amphiphiles can be used to modify the sweetness profile of sweet proteins and shorten the linger. It was suggested that the improved properties of the functional taste-improving compositions might be of significant importance for the fitness and uses of the compositions in food and beverage applications.

Specifically, as shown in the Examples below, the functional taste-improving compositions exhibit improved sensory profile as compared to the protein alone. As described herein, the sensory profile relates to a taste profile (e.g., sweetness potency, aftertaste, and lingering).

The samples were evaluated by a panel of (~15) pre-screened, highly-sensitive, trained and calibrated expert tasters: The parameters quantified included Sweetness profile over time (Sweetness intensity with time after intake), Linger (Area under the sweetness intensity vs. time curve (AUC) from 60 to 150 or to 300 seconds), Linger time (Delta time from initial- to zero sweetness), Ratio of the Intensity at 60 seconds to the maximal intensity, Linger T50: Time to reach 50% of the maximal sweetness, Linger T10: Time to reach 10% of the maximal sweetness. The qualitative similarity of the taste to that of sugar was also evaluated, to describe attributes other than time-intensity profile.

Thus, in its broadest aspect, the present disclosure relates to a functional taste-improving composition, comprising at least one TMP and at least one low molecular weight amphiphilic molecule.

The improved food-related properties encompass properties that increase the composition's fitness in food and beverage applications, such as flavor, texture, taste, sweetness threshold, sweetness level, sweetness profile, sensory profile, sweetness kinetics (sweetness intensity vs. time after oral intake), stability (structural and functional) during processing and shelf life, heat resistance, fitness to a food matrix (including fatty, salty, acidic and hot matrices), shelf-life in the dry-ingredient form and in the final product, masking and/or enhancement of other flavors, suppression of off-flavors, shorter taste onset, higher maximal intensity, shorter lingering taste, better taste roundness, or sugar-like taste.

In some embodiments, the at least one food-related property is sensory-affecting. The term "sensory-affecting property," as used herein, refers to a change in the sensory impression as determined, for example, by taste. The sensory-affecting property includes, for example, sweetness profile such as sweetness potency, sweetness kinetics (onset time, lingering time, taste duration), lack of off-taste (e.g., metallic taste), and masking or enhancing other tastes. For example, an improved property relates to increased sweetness, reduced onset time, or reduced lingering taste.

In accordance with some embodiments wherein the at least one property is the sensory-affecting property, the composition may be considered a sugar substitute. In some embodiments, the at least one food-related property is at least one of sweetness potency, reduced onset time, or reduced lingering taste.

In some embodiments, the at least one food-related property is stability. In some embodiments, the stability is at least one of thermal stability, longer shelf-life (in the dry ingredient form, or in the final product), stability to low pH or salt concentration, ionic strength stability, or stability in a fat-containing or protein-containing matrix. In some embodiments, the at least one food-related property is thermal stability.

In some embodiments, the at least one food-related property is increased shelf-life stability. For example, the composition may be stable for at least a week, two weeks, a month, and even over a year.

As detailed above, the composition may be used in combination with at least one additional food ingredient. In some embodiments, the at least one food-related property may refer to a synergistic effect between the composition and at least one food ingredient. Non-limiting examples of food ingredients include macro and micronutrients, artificial or natural flavors, food additives, food coloring, preservatives, bulking agents, encapsulating agents, or additional sweetening agents. The food ingredient may have masking, modulating, effecting or affecting triggered release of a taste-modifying component or enhancing taste effects.

As described herein, the composition is a taste-modifying composition and/or taste-enhancing composition and/or a flavoring composition and specifically a sweetening composition. A taste-modifying composition may add a sweet taste to a non-sweet substance, for example, water and sour substances. A functional taste-improving composition, as used herein, is known to bind to taste receptors and evoke a taste sensation. A functional taste-improving composition, as used herein, is known to bind to the sweet receptor and evoke a sensation of sweetness. Non-limiting examples of a sweet receptor include Taste receptor heterodimer made of two subunits such as type 1 member 1 (TAS1R1, Uniprot ID for human gene: TAS1R1_HUMAN), Taste receptor type 1 member 2 (TAS1R2, T1R2, TR2, UniProt—Q8TE23), Taste receptor type 1 member 3 (TAS1R3, T1R3, UniProt—Q7RTX0).

In some embodiments, the at least one TMP is a naturally occurring protein. In some other embodiments, the at least one TMP is found in plants, such as tropical plants. Non-limiting examples of plants include at least one of capparis masaikai, oubli, serendipity berry, katemfe, miracle fruit berry, or lemba.

In some embodiments, the least one TMP is selected from the group consisting of Thaumatin, Monellin, Miraculin, Curculin, Brazzein, and Mabinlin.

In some embodiments, the at least one TMP is Thaumatin.

In some embodiments, the at least one TMP is Monellin.

In some embodiments, the at least one TMP is Thaumatin-1 (GenBank Entry No. P02883). In some embodiments, the at least one TMP is Thaumatin-2 (GenBank Entry No. P02884).

In some embodiments, the at least one TMP is Monellin made out of chain A (GenBank Entry No. P02881) and chain B (GenBank Entry No. P02882).

In some embodiments, the at least one TMP is Miraculin (GenBank Entry No. P13087).

In some embodiments, the at least one TMP is Curculin-1 GenBank Entry No. P19667) or Curculin-2 (GenBank Entry No. Q6F495).

In some embodiments, the at least one TMP is Brazzein (also known as: Defensin-like protein) (GenBank Entry No. P56552).

In some embodiments, the at least one TMP is Mabinlin I/Sweet protein mabinlin-1 (GenBank Entry No. P80351), Mabinlin II (also known as Sweet protein mabinlin-2) (GenBank Entry No. P30233), Mabinlin III (also known as Sweet protein mabinlin-3) (GenBank Entry No. P80352), Mabinlin IV (also known as Sweet protein mabinlin-4) (GenBank Entry No. P80353) or Mabinlin-1 chain A (GenBank Entry No. B9SA35).

In some embodiments, the at least one TMP is a sequence not found in nature and is thus called a synthetic protein, a designer protein or an engineered protein. The synthetic protein may comprise the entirety or part of the amino acid sequence of the naturally occurring protein (all or part of the protein's polypeptide chains) or part thereof. For example, the at least one TMP may comprise a bond modification of a naturally occurring protein, resulting in a single polypeptide chain corresponding to a naturally occurring protein, such that the at least two polypeptide chains of the wild-type protein are covalently attached by other amino acids.

In some embodiments, the at least one TMP is a modified Monellin protein known as MNEI.

In some embodiments, the at least one TMP is a single chain Monellin (MNEI) protein (SEQ ID NO: 28). The MNEI amino-acid numbers are in accordance with Protein Databank (PDB) ID 2o9u.

In some embodiments, the at least one TMP comprises an amino acid sequence having at least one, at least two, at least three, at least four, at least five, at least six, at least ten, at least fifteen, at least eighteen amino acid substitutions and/or deletions relative to an amino acid sequence of a reference MNEI protein (denoted by SEQ ID NO:28).

In some embodiments, the at least one TMP comprises an amino acid sequence between 40% to 99% identical to an amino acid sequence of the reference MNEI protein. In some embodiments, the at least one TMP comprises an amino acid sequence between 90% to 99% identical to the amino acid sequence of the reference MNEI.

In some embodiments, the at least one TMP comprises an amino acid sequence between 60% to 90% identical to the amino acid sequence of the reference MNEI. In some embodiments, the at least one TMP comprising an amino acid sequence between 70% to 90% identical to the amino acid sequence of the reference MNEI.

The % identity between two or more amino acid sequences is determined for the two or more sequences when compared and aligned for maximal correspondence. In the context of the present disclosure, sequences (amino acid) described herein as having % identity are considered to have the same function/activity as the reference sequence to which identity is calculated.

Sequence similarity or sequence homology as used herein refer to the amount (%) of amino acids that are conserved with similar physicochemical properties, e.g., leucine and isoleucine.

In some embodiments, at least one TMP has a pI value of between 8.6 to 9.5.

In some embodiments, the functional taste-improving compositions described herein provide a sugar-like taste profile with a decreased, eliminated, or masked aftertaste or off-flavor (of, for example, a metallic taste or licorice taste) or a decreased, eliminated, or masked bitterness or decreased, eliminated, or masked sweet taste lingering.

As used herein, the phrases "sugar-like characteristic," "sugar-like taste," "sugar-like sweetness," "sugary," and "sugar-like" are synonymous. Sugar-like characteristics include any characteristic similar to that of sucrose and include, but are not limited to, sweetness onset, maximal response, short linger, flavor profile, temporal profile, adaptation behavior, mouthfeel, concentration/response function behavior, taste and flavor/sweet taste interactions, spatial pattern selectivity, and temperature effects. These characteristics are dimensions in which the taste of sucrose is different from the tastes of natural and synthetic high-potency sweeteners. Whether or not a characteristic is more sugar-like is determined by expert sensory panel assessments of sugar and the functional taste-improving compositions. Such assessments quantify similarities in the composition characteristics. Suitable procedures for determining whether a composition has a more sugar-like taste are well known in the art.

The term "flavor" or "flavor characteristic," as used herein, is the combined sensory perception of the components of taste, odor, and/or texture. The term "enhance," as used herein, includes augmenting, intensifying, accentuating, magnifying, and potentiating the sensory perception of a flavor characteristic without changing the nature thereof. The term "modify," as used herein, includes altering, varying, suppressing, depressing, fortifying, and supplementing the sensory perception of a flavor characteristic where the quality or duration of such characteristic was deficient.

"Micropatching" as used herein is defined as "the formation of molecular-level complexes of low Molecular Weight (Mw) of up to about 1 kDa amphiphiles (the "Micropatching Agents") and proteins (either TMP, food proteins, taste receptors, or other proteins in the oral cavity), wherein the low Mw amphiphiles interact with hydrophobic patches on the protein's solvent-accessible surface area (SASA); Such MP agent—TMP complexes would herein be defined as "Micropatched Proteins".

"Taste-modifying proteins (TMP)" as used herein are defined as proteins acting as substitutes of basic tastes such as but not limited to sweet, umami. as well as blockers, enhancers, maskers, and proteins that have flavor characteristics.

The term "amphiphilic molecule" used herein refers to a molecule displaying both polar and non-polar properties, as this molecule includes both hydrophobic (water-"fearing") and hydrophilic (water-"loving") group(s).

"Gymnemic acids" represent a class of chemical compounds isolated from the leaves of *Gymnema sylvestre* (Asclepiadaceae). Such acids generally confer an anti-sweet effect to beverages and foods. Gymnemic acids are triterpenoid glycosides, with aglycone gymnemagenin serving as the base structure. The aglycone gymnemagenin may be decorated with certain sugars, such as glucoronic acid, and with various ester groups. Such derivatives represent different gymnemic acids. Gymnemic acids may be chemically synthesized or, alternatively, extracted from a Gymnemic *sylvestre* herb. When extracted from a Gymnemic *sylvestre* herb, such extract typically comprises about 25%-75% gymnemic acids. As such, when included in the compositions of the present invention, synthetic gymnemic acids may be used or gymnemic acids present within Gymnemic *sylvestre* herb extract may be used. The invention provides that gymnemic acids, when present in the compositions of the present invention, will serve to mask the undesirable aftertaste that sometimes accompanies TMP consumption.

According to some embodiments, the gymnemic acid is selected from the group consisting of an inorganic salt of gymnemic acids, an organic salt of gymnemic acids, a cyclodextrin complex of gymnemic acid, a MD complex of gymnemic acid, a cryptand complex of gymnemic acid, a hydrate of gymnemic acid, a solvate of gymnemic acid, and combinations thereof.

According to some embodiments, the ASA may include lactisole, ziziphin (e.g., Ziziphus Jujube Extract), hodulcine, and their derivatives.

The term "functional" as used herein refers to preservation of the function (e.g., sweetness) following thermal or other processes (albeit possible structural changes).

The term "functional stability" as used herein refers to stability in formulation or in consumer-packaged good conditions rather than stability of pure material in dry, water or buffer form.

The term "effective amount" is understood to mean the amount of MP agent used to achieve a significantly noticeable improvement in a functional property of the TMP. For example, an MP agent reduces and/or suppresses the lingering aftertaste of the TMP. The effective amount of such MP agent may vary depending on many factors, including other ingredients, their relative amounts, and the desired effect. Any amount of lingering aftertaste masking molecules that provide the desired degree of lingering aftertaste masking effect without exhibiting off-taste or other adverse properties can be used.

*Quillaja* saponins extract, as used herein, are a mixture of triterpene glycosides extracted from the bark of the tree *Quillaja saponaria*. Saponins are found in different plants, including the bark of *Quillaja* (or *Quillaia*), also referred to as soap bark, *Quillaja Saponaria molina*, or Chilean Soap Bark Tree. Saponin is also found in the bark of the *yucca* tree, also known as *yucca* Shidigera, Mohave Extract, Joshua Tree, and Adam's Needle. *Quillija* is the preferred source of saponin because of the high levels of saponin contained therein, although saponin from *yucca* or a combination of *Quillaja* and *yucca* may be used as well. Saponins have been approved by the U.S. Food and Drug Administration as a food and beverage flavor. Typically, the *Quillaja* saponins include at least one QA, QS-21, QS-7, and other purified saponins.

As used herein, the term "foodstuff" means any edible oral composition, including beverages, confectionery products, chewing gum products, or food products.

The term "beverage" as used herein means any drinkable liquid or semi-liquid, including, for example, flavored water, soft drinks, fruit drinks, coffee-based drinks, tea-based drinks, juice-based drinks, milk-based drinks, jelly drinks, carbonated or non-carbonated drinks, alcoholic or non-alcoholic drinks.

As used herein, "orally ingestible composition" and "sweetening composition" are synonymous and refer to substances which contact the mouth of man or animal, including substances which are taken into and subsequently ejected from the mouth and substances which are drunk, eaten, swallowed, or otherwise ingested, and are safe for human or animal consumption when used in a generally acceptable range. These compositions include food, beverage, pharmaceutical, tobacco, nutraceutical, oral hygienic/cosmetic products, and the like. Non-limiting examples of these products include non-carbonated and carbonated soft drinks (CSDs) such as colas, ginger ale, root beers, ciders, fruit-flavored soft drinks (e.g., citrus-flavored soft drinks such as lemon-lime or orange), powdered soft drinks, and the like; fruit juices originating in fruits or vegetables, fruit juices including squeezed juices or the like, fruit juices containing fruit particles, fruit beverages, fruit juice beverages, beverages containing fruit juices, beverages with fruit flavorings, vegetable juices, juices containing vegetables, and mixed juices containing fruits and vegetables; sport drinks, energy drinks, near water and the like drinks (e.g., water with natural or synthetic flavorants); tea type or favorite type beverages such as coffee, cocoa, black tea, green tea, oolong tea and the like; beverages containing milk components such as milk beverages, coffee containing milk components, cafe au lait, milk tea, fruit milk beverages, drinkable yogurt, lactic acid bacteria beverages or the like; dairy products; bakery products; desserts such as yogurt, jellies, drinkable jellies, puddings, bavarian cream, blanemange, cakes, brownies, mousse, and the like, sweetened food or beverage products eaten at tea time or following meals; frozen foods; cold confections, e.g., types of ice cream such as ice cream, ice milk, lacto-ice and the like (food or beverage products in which sweeteners and various other types of raw materials are added to milk products and the resulting mixture is agitated and frozen), and ice confections such as sherbets, dessert ices and the like (food or beverage products in which various other types of raw materials are added to a sugary liquid and the resulting mixture is agitated and frozen); ice cream; general confections, e.g., baked confections or steamed confections such as cakes, crackers, biscuits, buns with bean-jam filling and the like; rice cakes and snacks; table top products; general sugar confections such as chewing gum (e.g., including compositions which comprise a substantially water-insoluble, chewable gum base, such as chicle or substitutes thereof, including jetulong, guttakay rubber or certain comestible natural synthetic resins or waxes), hard candy, soft candy, mints, nougat candy, jelly beans and the like; sauces including fruit flavored sauces, chocolate sauces and the like; edible gels; cremes including butter cremes, flour pastes, whipped cream and the like; jams including strawberry jam, marmalade and the like; spreads including peanut butter, chocolate spreads and the like; breads including sweet breads, and the like or other starch products; spice; general condiments including seasoned soy sauce used on roasted meats, roast fowl, barbecued meat, and the like, as well as tomato catsup (ketchup), sauces, noodle broth, and the like; processed agricultural products, livestock products or seafood; processed meat products such as sausage and the like; retort food or beverage products, pickles, preserves, soy sauce, delicacies, side dishes; snacks such as potato chips, cookies, or the like; cereal products; drugs, quasi-drugs and dietary supplements, that are administered orally or used in the oral cavity (e.g., vitamins, cough syrups, cough drops, chewable medicine tablets, amino acids, bitter-tasting drug or pharmaceutical agents, acidulants, or the like), wherein the drug may be in solid, liquid, gel, or aerosol form such as a pill, tablet, spray, capsule, syrup, drop, troche agent, powder, and the like; personal care products such as oral compositions used in the oral cavity such as mouth freshening agents, gargling agents, mouth rinsing agents, toothpaste, tooth polish, dentrifices, mouth sprays, teeth-whitening agents, and the like; dietary supplements; animal feed; and nutraceutical products, which includes any food or part of a food that may provide medicinal or health benefits, including the prevention and treatment of disease (e.g., cardiovascular disease and levels of high blood cholesterol, diabetes, osteoporosis, inflammation, or autoimmune disorders).

The term "amino acid sequence" and/or "polypeptide chain" describe a protein having an amino acid sequence or polypeptide chain. As such, the term "reference protein" is equivalent to the term "reference amino acid sequence," and the term "modified protein" is equivalent to the term "modified amino acid sequence." It should be noted that the terms "amino acid sequence" and/or "polypeptide chain" encompass sequences having a 3D structure as well as sequences with undetermined, intrinsically disordered or rheomorphic 3D structure or regions thereof.

The term "fragment" as used herein in connection with the disclosure relates to proteins or peptides derived from full-length proteins that are shortened, i.e., lacking at least one amino acid. Such fragments may include at least 10, more such as 20 or 30 or more consecutive amino acids of the protein's primary sequence.

The term "variant" used in the present disclosure relates to derivatives of a protein or peptide that include modifications of the amino acid sequence, for example, by substitution, deletion, insertion, or chemical modification. Such modifications, in some embodiments, do not reduce the functionality of the protein or peptide. Such variants include proteins, wherein one or more amino acids have been replaced by their respective D-stereoisomers or by amino acids other than the naturally occurring 20 amino acids, such as ornithine, hydroxyproline, citrulline, homoserine, hydroxylysine, and norvaline. However, such substitutions may also be conservative, i.e., the amino acid residue is replaced with a chemically similar amino acid residue.

The term "structural thermal stability" or "thermal stability" as used herein refers to the ability of the protein to retain its 3D structure fully or partly, or its functional properties (such as sweetness), at temperatures above the denaturation (or "melting") temperature of the reference protein or retain such stability over time e.g. shelf-life stability or prolonged stability during a heat treatment which may be below the melting temperature. The 3D structural stability of a protein can be measured by any method known in the art, such as Circular Dichroism (CD) or thermal shift assays such as Differential Scanning Fluorimetry (DSF) or Differential Scanning calorimetry (DSC). The 3D protein structure may influence protein function such as potency or sensory profile. Notably, the shelf-life and thermal stability of food and beverage products may be related to the structural thermal stability of proteins and other components. For example, High-Temperature Short-Time Pasteurization (HTST), or other heat treatments during preparation of the food or beverage product, can be applied by different protocols that typically apply a high temperature over a very short time, to minimize chemical changes and protein denaturation during bacterial inactivation. Hence protein performance is related to the heat resistance of retaining the protein structure during the process.

As described herein, the modified protein may result from amino acid substitutions or deletions at various regions of the protein. "Regions of the protein," as used herein, refers to an amino acid sequence or structural motif that is part of the protein sequence (amino acid sequence) or structure, potentially with a structural region that surrounds the regional element of interest such as four or five or six angstroms around the regional element of interest. Non-limiting examples of protein regions include protein surface, protein core, protein loop region, secondary structure, alpha-helix region, beta-sheet region, beta-turn region, capping region, disulfide region, binding-site region, a linker region, hydrophobic-patch region, or protein hydrophobic region.

The amino acid substitution in the TMP sequence is not limited to a specific protein region or sequence. Regions of the TMP that may include amino acid substitutions include the protein surface, hydrophobic core, or regions called loop regions, secondary structures, edges of secondary structures (also denoted secondary structure capping regions), disulfide regions, binding-site regions, linker regions, and hydrophobic-patch regions.

As used herein, the protein surface region is the area with partial or full solvent accessibility (SASA—solvent accessible surface area). The protein core region, as used herein, is the area not accessible to solvent with an amino-acid relative SASA of less than 50% or less than 20% for the inner core.

The amino acids may be referred to herein by either their commonly known three letter symbols or by the one-letter symbols recommended by the IUPAC-IUB Biochemical Nomenclature Commission. Amino acid substitution (replacement) as used herein refers to a change from one amino acid to a different amino acid. This is typically due to a point mutation in the DNA sequence caused by a nonsynonymous missense mutation, which alters the codon sequence to code a different amino acid than the references. An amino acid replacement may affect protein function or structure, generally depending upon how similar or dissimilar the replaced amino acids are and their position in the sequence or structure. For example, the amino acid substitutions may be made based on similarity in polarity, charge, solubility, hydrophobicity, hydrophilicity, bulkiness (or flexibility), beta-branching, aromaticity, ability to confer specific bonding interactions (hydrogen bonds, salt bridges, polar and nonpolar interactions), pKa, ability to bind sugars and other post-translational modifications, and/or the amphipathic nature of the residues involved.

In some embodiments, the amino acid substitutions may be a conservative replacement. Such replacements encompass changing one amino acid into another amino acid with similar properties. A conservative amino acid replacement (also denoted as conservative amino acid "substitutions" or conservative amino acid mutations) is an amino acid replacement in a protein that changes a given amino acid to a different amino acid with similar biochemical, structural, and/or chemical properties.

For example, amino acids may be sorted into six main classes based on their structure and the general chemical characteristics of their side chains (R groups).

Aliphatic: Isoleucine (I), Leucine (L), Glycine (G), Alanine (A), Valine (V);

Hydroxyl or sulfur/selenium-containing: Serine (S), Cysteine (C), Threonine (T), Methionine (M);

Cyclic: Proline (P);

Aromatic: Phenylalanine (F), Tyrosine (Y), Tryptophan (W);

Basic: Histidine (H), Lysine (K), Arginine (R);

Acidic and their amides: Aspartate (D), Glutamate (E), Asparagine (N), Glutamine (Q).

In addition, each of the following groups contains other exemplary amino acids that are conservative substitutions for one another:

1) Very small: Alanine (A), Glycine (G);
2) Negative charge: Aspartic acid (D), Glutamic acid (E);
3) Polar (amidated carboxyl side chain): Asparagine (N), Glutamine (Q);
4) Positively charged: Arginine (R), Lysine (K);
5) Aromatic: Phenylalanine (F), Tyrosine (Y), Tryptophan (W), and occasionally also Histidine (H);
6) Small polar: Serine (S), Threonine (T);
7) Sulfur-containing: Cysteine (C), Methionine (M);
8) Small: Ala (A), Glycine (G), Serine (S);
9) Beta-branched: Valine (V), Isoleucine (I) and occasionally also Threonine (T);
10) Polar: Asparagine (N), Glutamine (Q), Serine (S), Threonine (T).

Nevertheless, there are numerous clusters of amino acids yielding multiple amino acids indices, with each highlighting a different aspect of the amino acid characteristics—e.g., see hundreds of such indices in the amino acid index database https://www.genome.jp/aaindex/. Consequently, some of the conservative replacements may represent other important features for protein fitness for industrial use in the food and beverage industry, e.g., non-specific binding to the tongue or other sensory profile aspects.

An additional conservation analysis is based on the following,

Nonpolar "hydrophobic" amino acids are selected from the group consisting of Valine (V), Isoleucine (I), Leucine (L), Methionine (M), Phenylalanine (F), Tryptophan (W), Cysteine (C), Alanine (A), Tyrosine (Y), Histidine (H), Threonine (T), Serine (S), Proline (P), Glycine (G), Arginine (R) and Lysine (K);

"Polar" amino acids are selected from a group consisting of Arginine (R), Lysine (K), Aspartic acid (D), Glutamic acid (E), Asparagine (N), Glutamine (Q);

"Positively charged" amino acids are selected from the group consisting of Arginine (R), Lysine (K), and Histidine (H); and "Acidic" amino acids are selected from the group consisting of Aspartic acid (D), Asparagine (N), Glutamic acid (E), and Glutamine (Q).

As described herein, the taste improving composition has an improved food-related property. The composition's sweetness profile, such as sweetness potency (sugar-like flavor), reduced or lack of off-taste, reduced onset time, and reduced lingering taste of the composition, may be determined by any known taste test known in the art. For example, a comparison to the sweetness of sucrose or other sweeteners can be made by a taste panel, and the sweetness potency may be graded as detailed in the examples below.

The comparison may be made by determining the composition's threshold as compared to a known sweetener, such as sucrose, for example, by determining the minimum concentration required to evoke the sensation of sweetness, or a sweetness profile assessment, including characteristics such as sweetness profile, sweetness onset time, lingering taste, mouthfeel, aftertaste, off-taste, and masking of unwanted tastes.

As used herein, the term sweetening-affecting properties encompass a sweet sensation determined by at least one of a sweetness threshold of about 0.28 mg/L, or about 23-0.5 mg/L, or higher, sweetness duration of about between 1 and 20 seconds, at times between 2 and 18 seconds, particularly at times between 2 and 4 seconds.

The sensory profile includes taste kinetics, showing taste intensity over time, i.e., onset duration (time until feeling taste), taste duration, and time of lingering taste (corresponding to the tail of the time intensity curve). Additional features include off-taste (e.g., due to binding to other taste receptors), taste roundness, metallic and other off-tastes, synergy with other ingredients (e.g., masking and enhancing other flavors or unwanted tastes, such as *stevia*), mouthfeel, and alike.

In some embodiments, the taste improving composition is characterized by at least one of the following being equal or improved relative to the reference protein: (1) structural thermal stability, (2) functional thermal stability reflecting the maintenance of the sensory potency at elevated temperatures, (3) pH stability, (4) solubility in water or a partly aqueous milieu (e.g., foods containing fat), (5) concentration and dilution stability, (6) freeze-thaw stability, (7) drying & reconstitution stability, or (8) shelf-life stability.

The taste improving composition described herein is characterized by a sweet taste as well as other taste effects (masking unwanted tastes, less aftertaste, less lingering taste, less off-taste, and umami taste, better mouthfeel) that may be used as a sweetener in the preparation of a product for oral delivery.

The modified taste improving composition can be used as a flavor modifying agent or a flavor-enhancing agent.

The taste improving composition described herein is for use as an oral product. In some embodiments, the product is a food or beverage product, a dietary supplement product, or a medicament. For product preparation, the proteins described herein may be combined with any food-grade additive. The food or beverage product may be provided and used in any solid dry form, including, without being limited thereto, fine powder, lyophilizate, granulate, tablets, etc. In some embodiments, the composition is provided in liquid form, for example, as a solute in water (aqueous solution).

The product comprising the taste improving composition may have various applications. This includes, without being limited thereto (each of the following constituting a separate embodiment of the present disclosure), utilization as a sweetener, flavor, enhancer, maskers, taste-modulator and proteins that have flavor characteristics in the food and beverages industry (fruit and vegetable juice and nectars, soft drinks, ready-to-drink beverages, syrups, functional drinks, sports drinks, etc.), in the dairy industry, i.e., dairy products, yogurts, and puddings; in the pharmaceutical industry; the naturopathic industry, the nutraceutical industry, and other healthcare products (e.g., toothpaste and mouthwash), confectionary, candy and gum industry, vegetables (e.g. ketchup or sauces) or any other application that requires the use of a flavor modifying composition as an excipient or additive.

According to some embodiments, the additional food ingredient is selected from a group consisting of sucrose, fructose, glucose, agave nectar, brown rice syrup, date sugar, honey, maple syrup, molasses, monk fruit, sugar alcohols, rare sugars, *stevia*, aspartame, sucralose, acesulfame potassium, maltodextrin, oligosaccharides, and dietary fibers.

It should be noted that the TMP, according to the invention, can be produced by any method known in the art; for example, the protein can be produced synthetically, by recombinant DNA technology, or by protein production in microorganisms via fermenters, in plants or plant callus, or other bioreactors. In some embodiments, the modified proteins may be produced in bacteria, such as *E. coli*. In some other embodiments, the TMPs may be produced in yeast or fungi, such as *Saccharomyces cerevisiae Aspergillus,*

*Trichoderma* or *Pichia pastoris*. In some embodiments, the DNA sequence of the chosen amino acid sequence is optimized at the RNA and DNA levels. At the RNA level, this includes minimization of RNA secondary structures to ensure quick insertion into the ribosome. At the DNA level, this includes codon optimization to the host organism (taking into account the RNA-level optimization). Codon-usage optimization provides a preference for using the most abundant tRNA in the host organism for each amino acid expressed.

With regards to the above, it is to be understood that, where provided, percentage values such as, for example, 10%, 50%, 120%, 500%, etc., are interchangeable with "fold change" values, i.e., 0.1, 0.5, 1.2, 5, etc., respectively.

All scientific and technical terms used herein have meanings commonly used in the art unless otherwise specified. The definitions provided herein facilitate understanding of certain terms used frequently herein and are not meant to limit the scope of the present disclosure.

As used herein, the term "about" refers to ±10%. The terms "comprises," "comprising," "includes," "including," "having," and their conjugates mean "including but not limited to." The term "consisting essentially of" means that the composition, method, or structure may include additional ingredients, steps, and/or parts, but only if the additional ingredients, steps and/or parts do not materially alter the basic and novel characteristics of the claimed composition, method or structure. The term "about" as used herein indicates values that may deviate up to 1%, more specifically 5%, more specifically 10%, more specifically 15%, and in some cases up to 20% higher or lower than the value referred to, the deviation range including integer values, and, if applicable, non-integer values as well, constituting a continuous range.

It must be noted that, as used in this specification and the appended claims, the singular forms "a," "an," and "the" include plural referents unless the content clearly dictates otherwise.

NON-LIMITING EXAMPLES

Example 1: Using EGCG as a MP Agent for Single-Chain Monellin (MNEI)

Materials and Methods

Production of Recombinant MNEI Proteins

Recombinant MNEI proteins were produced in *E. coli* BL21(DE3+) under a T7 promoter induced with Isopropyl ß-D-1-thiogalactopyranoside (IPTG). Using this system, MNEI proteins were expressed as cytosolic proteins (soluble fraction) in a high-density fermentation process.

Designer-MNEI or Designer monellin (both denoted as DM) are designed proteins with amino acid substitutions and/or deletions. Some of the DM molecules were disclosed in WO2019215730 of the inventors of the present invention.

TABLE 1

Sequences of the modified proteins

| SEQ ID NO: | Sequence |
|---|---|
| SEQ ID NO: 1 (DM03) | GNWEIIDTGPFTQKLGKFAVDEANKIGKYGTLTFTK VIRPTMKKTIYENEGFREIKGYEYQLYVKANDKLFR ADISEDYKTRGLKLLRFNGPVPPP |
| SEQ ID NO: 2 (DM08) | GNWEIIDIGPFTQNLGKFAVDEVNKIGQYGRLTFNK VIRPCMKKTIYENEGFREIKGYEYQLYVKASDKLFR ADISEDYKTRGRKLLRFNGPVPPP |
| SEQ ID NO: 3 (DM09) | GNWEIIDIGPFTQNLGKFAVDEANKIGQYGRLTFNK VIRPCMKKTIYENEGFREIKGYEYQLYVRASDKLFR ADISEDYKTRGRKLLRFNGPVPPP |
| SEQ ID NO: 4 (DM10) | GEWEIIDIGPFTQNLGKFAVDEENKIGKYGTLTFTKV IRPCMKKTIYENEGFREIKGYEYQLYVYANDKLFRA DISEDYKTRGRKLLRFNGPVPPP |
| SEQ ID NO: 5 (DM11) | GEWEIIDTGPFTQKLGKFAVDEENKIGQYGRLTFNK VIRPTMKKTIYENEGFREIKGYEYQLYVYASDKLFR ADISEDYKTRGLKLLRFNGPVPPP |
| SEQ ID NO: 6 (DM12) | GEWEIIDTGPFTQNLGKFAVDEENKIGQYGRLTENK VIRPTMKKTIYENEGFREIKGYEYQLYVYASDKLFR ADISEDYKTRGLKLLRFNGPVPPP |
| SEQ ID NO: 7 (DM13) | GNWEIIDIGPFTQNLGKFAVDEVNKIGQYGRLTFNK VIRPCMKKTIYENEGFREIKGYEYQLYVKASDKIFRA DISEDYKTRGRKLLRFNGPVPPP |
| SEQ ID NO: 8 (DM14) | GNWEIIDIGPFTQNLGKFAVDEANKIGQYGRLTENK VIRPCMKKTIYENEGFREIKGYEYQLYVRASDKIFRA DISEDYKTRGRKLLRFNGPVPPP |
| SEQ ID NO: 9 (DM15) | GNWEIIDIGPFTQNLGKFAVDEENKIGQYGRLTENK VIRPCMKKTIYENEGFREIKGYEYQLYVKASDKIFRA DISEDYKTRGRKLLRFNGPVPPP |
| SEQ ID NO: 10 (DM16) | GNWEIIDIGPFTQNLGKFAVDEVNKIGQYGRLTENT VIRPCMKKTIYENEGFREIKGYEYQLYVKASDKIFRA DISEDYKTRGRKLLRFNGPVPPP |

TABLE 1-continued

Sequences of the modified proteins

| SEQ ID NO: | Sequence |
|---|---|
| SEQ ID NO: 11 (DM17) | GNWEIIDIGPFTQNLGKFAVDEANKIGQYGRLTENT VIRPCMKKTIYENEGFREIKGYEYQLYVRASDKIFRA DISEDYKTRGRKLLRFNGPVPPP |
| SEQ ID NO: 12 (DM18) | GNWEIIDIGPFTQNLGKFAVDEENKIGQYGRLTFNTV IRPCMKKTIYENEGFREIKGYEYQLYVKASDKIFRAD ISEDYKTRGRKLLRFNGPVPPP |
| SEQ ID NO: 13 (DM19) | GNWEIIDIGPFTQNLGKFAVDEANKIGQYGRLTFTTV IRPCMKKTIYENEGFREIKGYEYQLYVRASDKIFRAD ISEDYKTRGRKLLRFNGPVPPP |
| SEQ ID NO: 14 (DM20) | GNWEIIDIGPFTQNLGKFAVDEENKIGQYGRLTFTTV IRPCMKKTIYENEGFREIKGYEYQLYVRASDKIFRAD ISEDYKTRGRKLLRFNGPVPPP |
| SEQ ID NO: 15 (DM21) | GEWEIIDIGPFTQNLGKFAVDEENKIGQYGRLTFTTV IRPCMKKTIYENEGFREIKGYEYQLYVRASDKIFRAD ISEDYKTRGRKLLRFNGPVPPP |
| SEQ ID NO: 16 (DM22) | GNWEIIDIGPFTQNLGKFAVDEENKIGQYGRLTFNTV IRPCMKKTIYENEGFREIKGYEYQLYVRASDKIFRAD ISEDYKTRGRKLLRFNGPVPPP |
| SEQ ID NO: 17 (DM23) | GEWEIIDIGPFTQNLGKFAVDEENKIGQYGRLTFNTV IRPCMKKTIYENEGFREIKGYEYQLYVRASDKIFRAD ISEDYKTRGRKLLRFNGPVPPP |
| SEQ ID NO: 18 (DM24) | GNWEIIDIGPFTQNLGKFAVDEANKIGQYGRLTFTK VIRPCMKKTIYENEGFREIKGYEYQLYVRASDKIFRA DISEDYKTRGRKLLRFNGPVPPP |
| SEQ ID NO: 19 (DM25) | GNWEIIDIGPFTQNLGKFAVDEINKIGQYGRLTFNKV IRPCMKKTIYENEGFREIKGYEYQLYVRASDKLFRA DISEDYKTRGRKLLRFNGPVPPP |
| SEQ ID NO: 20 (DM26) | GEWEIIDIGPFTQNLGKFAVDEENKIGQYGRLTFNKV IRPCMKKTIYENEGFREIKGYEYQLYVRASDKIFRAD ISEDYKTRGRKLLRFNGPVPPP |
| SEQ ID NO: 21 (DM27) | GNWEIIDIGPFTQNLGKFAVDEVNKIGQYGRLTFNK VIRPCMKKTIYENEGFREIKGYEYQLYVRASDKLFR ADISEDYKTRGRKLLRFNGPVPPP |
| SEQ ID NO: 22 (DM28) | GNWEIIDIGPFTQNLGKFAVDEANKIGQYGRLTENK VIRPCMKKTIYENGEIKGYEYQLYVRASDKLFRADIS EDYKTRGRKLLRFNGPVPPP |
| SEQ ID NO: 23 (DM29) | GEWEIIDIGPFTQNLGKFAVDEENKIGQYGRLTFNKV IRPCMKKTIYENGEIKGYEYQLYVYASDKLFRADISE DYKTRGRKLLRFNGPVPPP |
| SEQ ID NO: 24 (DM30) | GNWEIIDIGPFTQNLGKFAVDEINKIGQYGRLTFNKV IRPCMKKTIYENEGFREIKGYEYQLYVRASDKIFRAD ISEDYKTRGRKLLRFNGPVPPP |
| SEQ ID NO: 25 (DM31) | GNWEIIDIGPFTQNLGKFAVDEANKIGQYGRLTENK VIRPCMKKTIYENGEIKGYEYQLYVRASDKIFRADIS EDYKTRGRKLLRFNGPVPPP |
| SEQ ID NO: 26 (DM32) | GNWEIIDIGPFTQNLGKFAVDEVNKIGQYGRLTFNK VIRPCMKKTIYENGEIKGYEYQLYVKASDKIFRADIS EDYKTRGRKLLRFNGPVPPP |
| SEQ ID NO: 27 (DM33) | GNWEIIDIGPFTQNLGKFAVDEVNKIGQYGRLTFNT VIRPCMKKTIYENGEIKGYEYQLYVKASDKIFRADIS EDYKTRGRKLLRFNGPVPPP |
| SEQ ID NO: 28 (MNEI) | GEWEIIDIGPFTQNLGKFAVDEENKIGQYGRLTFNKV IRPCMKKTIYENEGFREIKGYEYQLYVYASDKLFRA DISEDYKTRGRKLLRFNGPVPPP |

Preparation of Micro-Patching (NIP) Agents—Protein Complexes

EGCG-TMP complexes were prepared as follows:

EGCG (PureGreen EGCG PG-EG95DCL, Chengdu Wagott Biotech Co Ltd, China EGCG≥95.0%, batch No: 200627-02) stock solution was prepared in dilute citric acid, added to 20 mM Phosphate buffer, to an EGCG concentration of 20 mg/ml and a final pH of about 4. The following molar ratios of TMP:EGCG were tested in the sensory panel: 1:10, 1:26, 1:40 (sample 912 in FIG. 1), and 1:60. (Final MNEI concentration of 0.08 mg/ml). Herein, the TMP that was used is a sweet protein (SP) such as MNEI or DM.

The TMP concentrate was acidified with phosphoric acid to pH 2.5. EGCG powder was added into the TMP which may be an SP solution at a molar ratio of 5:1 EGCG:TMP and stirred at room temperature for 1 hr to complete dissolution and refrigerated. For a longer shelf life, the solution may be freeze-dried, preferably with the help of cryoprotectants like sucrose or maltodextrin.

Beverage Samples Preparation for Tasting

Dilute citrate buffer was prepared in mineral water. The SP or MP-SP solution was dissolved or diluted for a final protein concentration of 0.08 mg/ml (equivalent to 8% sucrose).

Beverage and yogurt samples also underwent sensory evaluation using different ratios of MP agents and SP.

Sensory Evaluation

All micro-patched SP (MP-SP) were evaluated for sweetness intensity over time. The sensory panelists for the evaluation were screened for sensitivity for small differences in sweetness intensity and other basic tastes (saltiness, sourness, and bitterness), as well as sensory memory. These screening tests were performed according to ISO standards (IS 8586). The sensory expert panel was professionally trained and continuously assessed as to reproducibility and capability to differentiate between standard samples.

Sensory Method—Time Intensity (Measuring Sweetness Intensity Over Time):

1. The products were tasted by an expert panel.
2. Panelists were calibrated first with sugar solutions on a scale of 0-100 (magnitude estimation), while 0=not sweet at all. Calibration solutions used were 4% sucrose (defined as 50 sweetness) and 8% (defined as 100 sweetness grade).
3. After calibration, the tasters preformed time-intensity evaluation for each sample according to the following stages:
    a. After giving a signal, all tasters put the sample in their mouth, rolled it in their oral cavity for 2 seconds, and then swallowed.
    b. After swallowing, the guide measured times, and at each time point, the taster was asked to grade the currently sensed sweetness intensity on the same scale (0-100) until the taste has disappeared.
    c. The time periods examined were: 1, 2, 5, 7, 10, 15, 30, 45, 60, 90, 120, 150, 180, 210, 240, 270, and 300 seconds.
4. Each panelist tasted a total of 6 products: SP standalone and four ratios of EGCG+SP tasted in varying orders. Sucrose solution (8Bx) was always tasted at the end.
5. All the tested products were served using code numbers.
6. Before and between samples, the tasters were requested to rinse their mouth with mineral water, eat an unsalted cracker and a cucumber, and drink water again.
7. 11-15 tasters participated in these tests.

Results and Discussion

As demonstrated in FIG. 1, EGCG:SP 40:1 showed superior results than SP standalone. As EGCG:SP 60:1 was perceived by the panel as slightly bitter, and 10:1 and 26:1 were not sufficiently effective, the sample EGCG:SP 40:1 appeared best. In FIG. 1, the SP is MNEI. The sweetness intensity timeline of EGCG:SP 40:1 shows a pronounced improvement (shortening) in taste lingering compared to SP and closer to that of sugar (FIG. 1).

Figure 2:
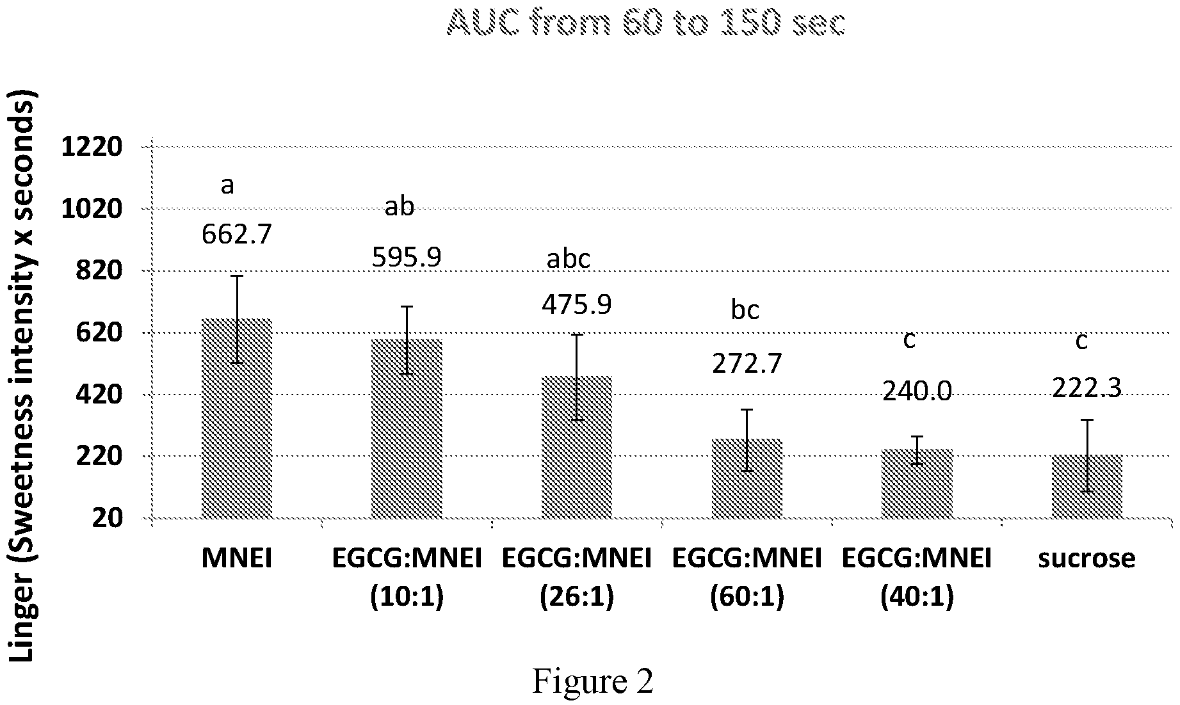
FIG. 2 demonstrates that the Linger (Area Under the Curve (AUC) of the sweetness-intensity vs. time, in the range of 60-150 seconds) shows significantly lower AUC for EGCG:MNEI 40:1 compared to MNEI alone. The reduced AUC area of EGCG:MNEI from 26:1 to 40:1 is similar to that of sucrose. Different letters designate statistically significant differences (P<0.05). For example, the AUC of MNEI is significantly higher than the AUC of EGCG:MNEI (60:1) because it has different letters.

Area under the curve (AUC) was calculated using the Friedman Test and one-way repeated ANOVA with ranks. 60 sec is a typical linger of sugar (sucrose) hence the range after 60 sec, is of particular interest in quantifying linger. AUC in the range of 60-150 seconds shows a significantly lower AUC for EGCG:SP 40:1 compared to MNEI standalone. The reduced AUC area of EGCG:SP 40:1 is similar to that of sucrose (FIG. 2).

It was demonstrated that EGCG significantly improved the sweetness profile of SP by decreasing taste lingering and changing the sweetness profile so that it better resembles sugar's temporal sweetness profile.

Example 2: The Effect of *Quillaja*, Gymnemic Acids and Ammonium Glycyrrhizinate or Combinations Thereof on the Sweetness Intensity of DM09

*Quillaja*-DM09 complexes were prepared as follows:

*Quillaja* (QUEXT100, Lot no. 351-19171-CT, Garuda Int'l Inc.) was dissolved in mineral water at a concentration of 33 mg/ml. The following DM09:*Quillaja* molar ratios were tested: 1:5 and 1:26, in dilute citric acid (DM09 concentration of 0.02 mg/ml).

The complexes containing DM09, GA and MAG were prepared as follows:

GA was dissolved at a concentration of 5 mg/ml in citrate buffer at a pH of 6. DM09 stock solution was also prepared in citrate buffer at a pH of 6 (5 mg/ml). While MAG was dissolved in 5% phosphoric acid (5 mg/ml). The formulation was prepared by mixing DM09 with the various ingredients at the specified ratio and diluted to the drinking level of DM09 (0.02 mg/ml) in citrate buffer at a pH of 3.6.

Figure 3:
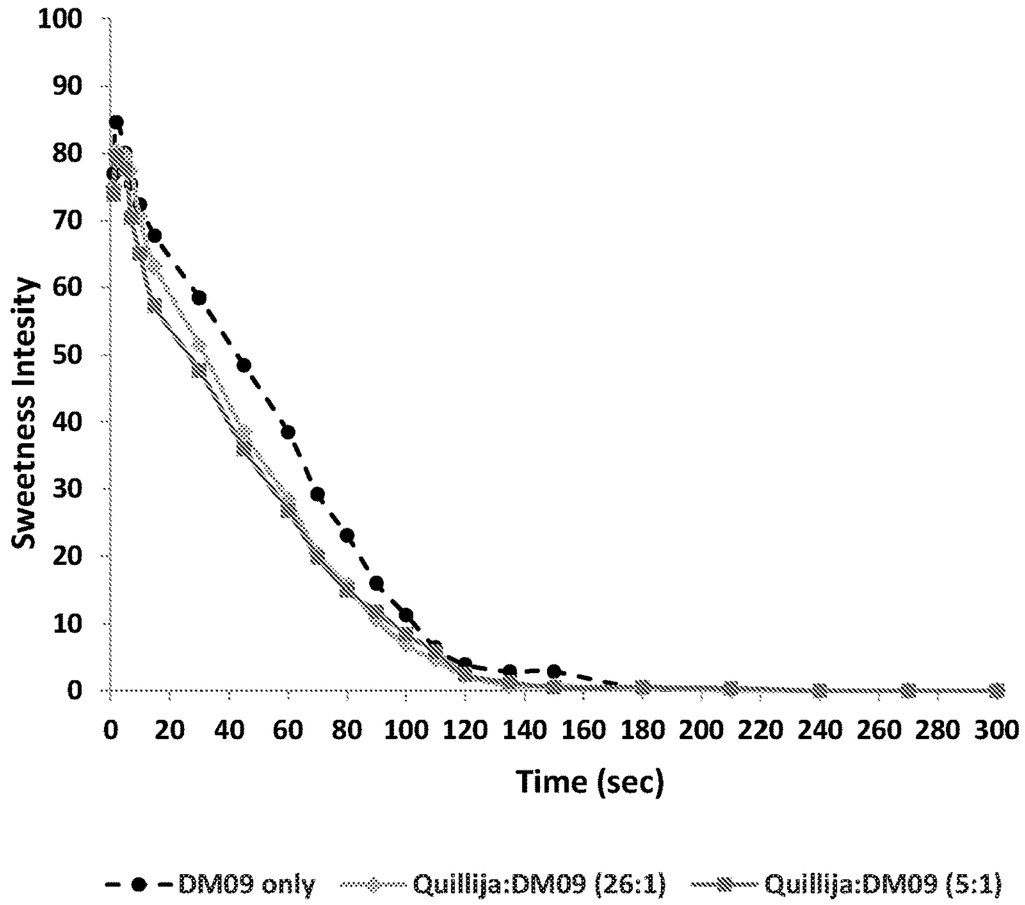
FIG. 3 shows the effect of *Quillaja* Saponins extract (as MP agents) at a 26:1 molar ratio with DM09 (SEQ ID No: 3), and *Quillaja* Saponins extract at a 5:1 molar ratio with DM09 compared to DM09 alone, at 8 Bx sugar equivalence sweetness level, on sweetness profile over time with the same method as FIG. 1.
Figure 4:
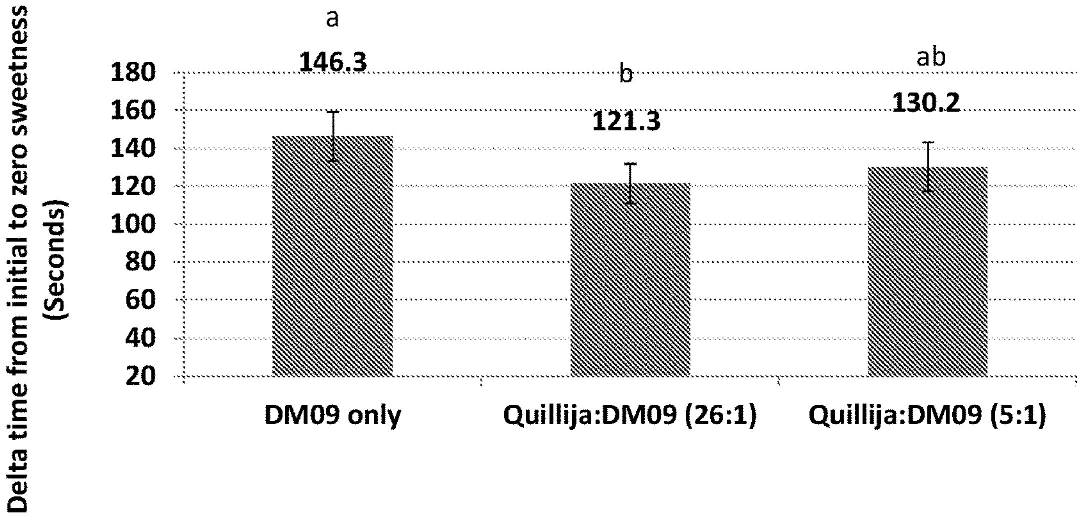
FIG. 4 shows the effect of *Quillaja* Saponins extract at 26:1 and 5:1 molar ratios with DM09, compared to DM09 alone, at 8 Bx sugar equivalence level on Linger time (Delta time (in sec) from initial to 0 sweetness intensity). Different letters designate statistically significant differences (P<0.05). For example, the delta time of DM09 only is significantly higher than the delta time of *Quillija*:DM09 (26:1).

FIGS. 3-4 demonstrate the effect of *Quillaja* saponins at 26:1 and 5:1 molar ratio with DM09, compared to DM09 alone, at 8 Bx sugar equivalence level, on sweetness profile over time. The linger was significantly ($P<0.05$) shorter in the 26:1 molar ratio compared to DM09 alone.

Figure 5:
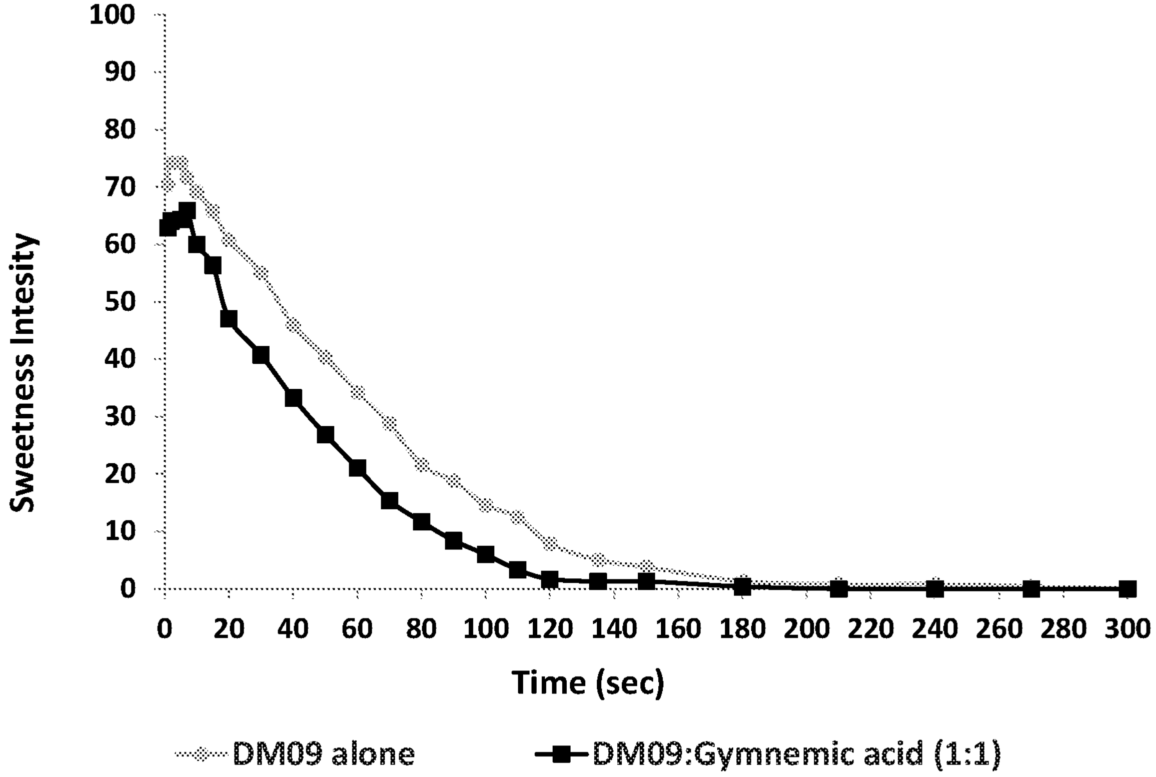
FIG. 5 shows the effect of Gymnemic acids at a 1:1 w/w ratio with DM09, compared to DM09 alone, at 8 Bx sugar equivalence level, by observing sweetness profile over time. The Fig. follows the method of FIG. 1.
Figure 6:
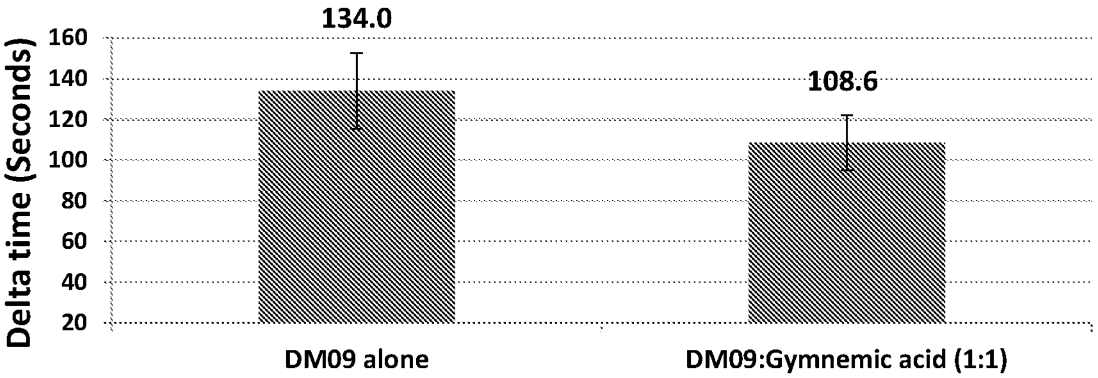
FIG. 6 shows the linger-shortening effect of Gymnemic acids at a 1:1 molar ratio with DM09, compared to DM09 alone, at 8 Bx sugar equivalence level, by observing Delta time (in sec) from initial to 0 sweetness intensity.

FIG. 5 demonstrates the effect of gymnemic acids at a 1:1 w/w ratio with DM09, compared to DM09 alone, at 8 Bx sugar equivalence level, on sweetness profile over time. GA somewhat decreased the maximal intensity, but had a stronger impact of shortening the linger (delta time, FIG. 6).

Figure 11:
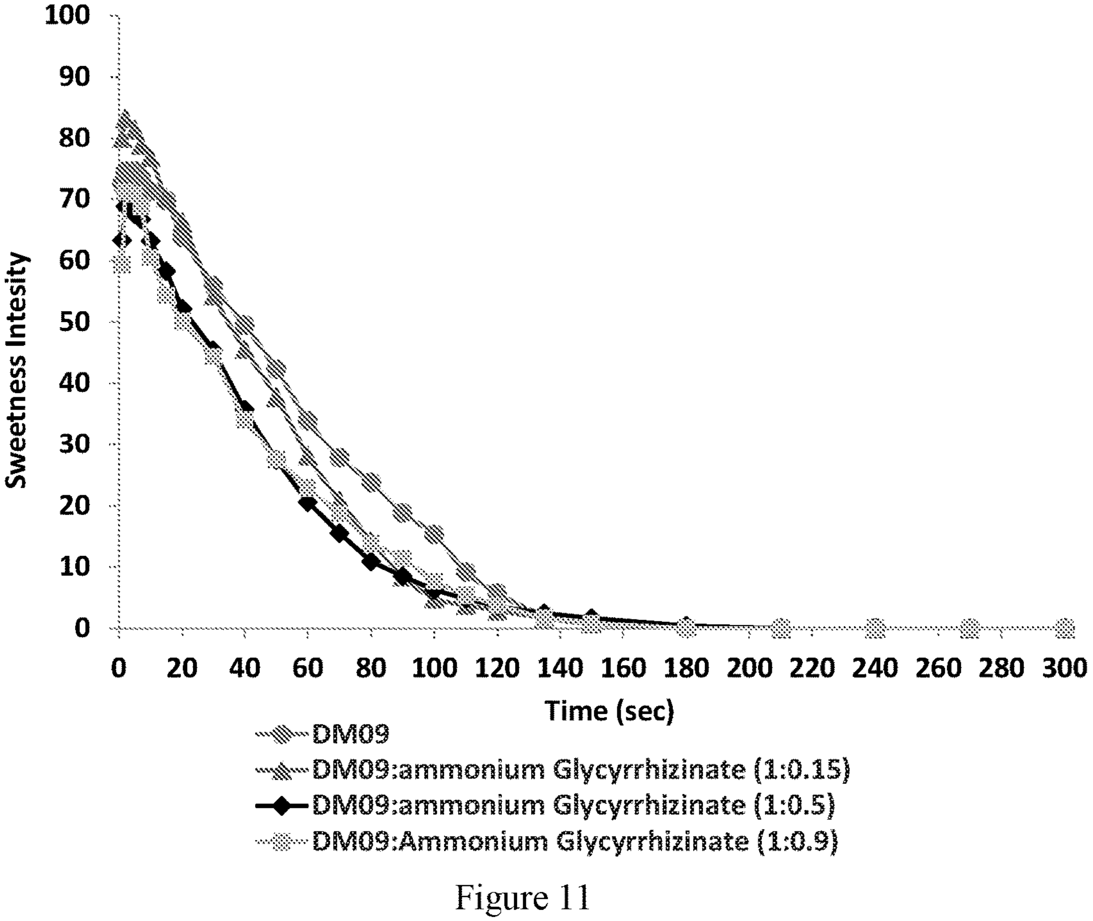
FIG. 11 shows the effect of Ammonium Glycyrrhizinate at different ratios with DM09, compared to DM09 alone, at 8 Bx sugar equivalence level, on sweetness profile over time. Methods as described for FIG. 1.

FIG. 11 shows the effect of the mono-ammonium glycyrrhizinate at different weight ratios with DM09, compared to DM09 alone, at 8 Bx sugar equivalence level, on sweetness profile over time. The 1:0.15 ratio gave highest maximal sweetness, followed by rapid decrease in sweetness.

Figure 12:
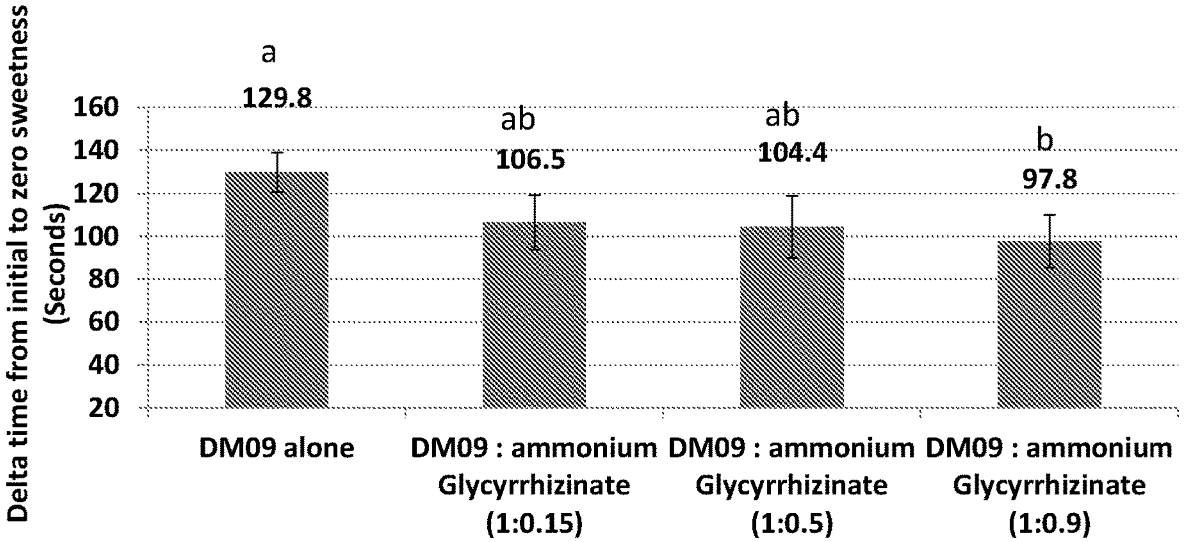
FIG. 12 shows the effect of Ammonium Glycyrrhizinate at different ratios with DM09, compared to DM09 alone, at 8 Bx sugar equivalence level: Delta time (in seconds) from initial to 0 sweetness intensity. Different letters indicate significantly different result (P<0.05). For example, the delta time of DM09 alone is significantly higher than the delta time of DM09:ammonium Glycyrrhizinate because it has different letters.

FIG. 12 shows the effect of mono-ammonium glycyrrhizinate at different weight ratios with DM09, compared to DM09 alone, at 8 Bx sugar equivalence level:Delta time (in sec) from max to 0 sweetness intensity. The 1:0.9 DM09:AG gave a significantly lower lingering time (delta time), compared to the DM09 alone.

Figure 13:
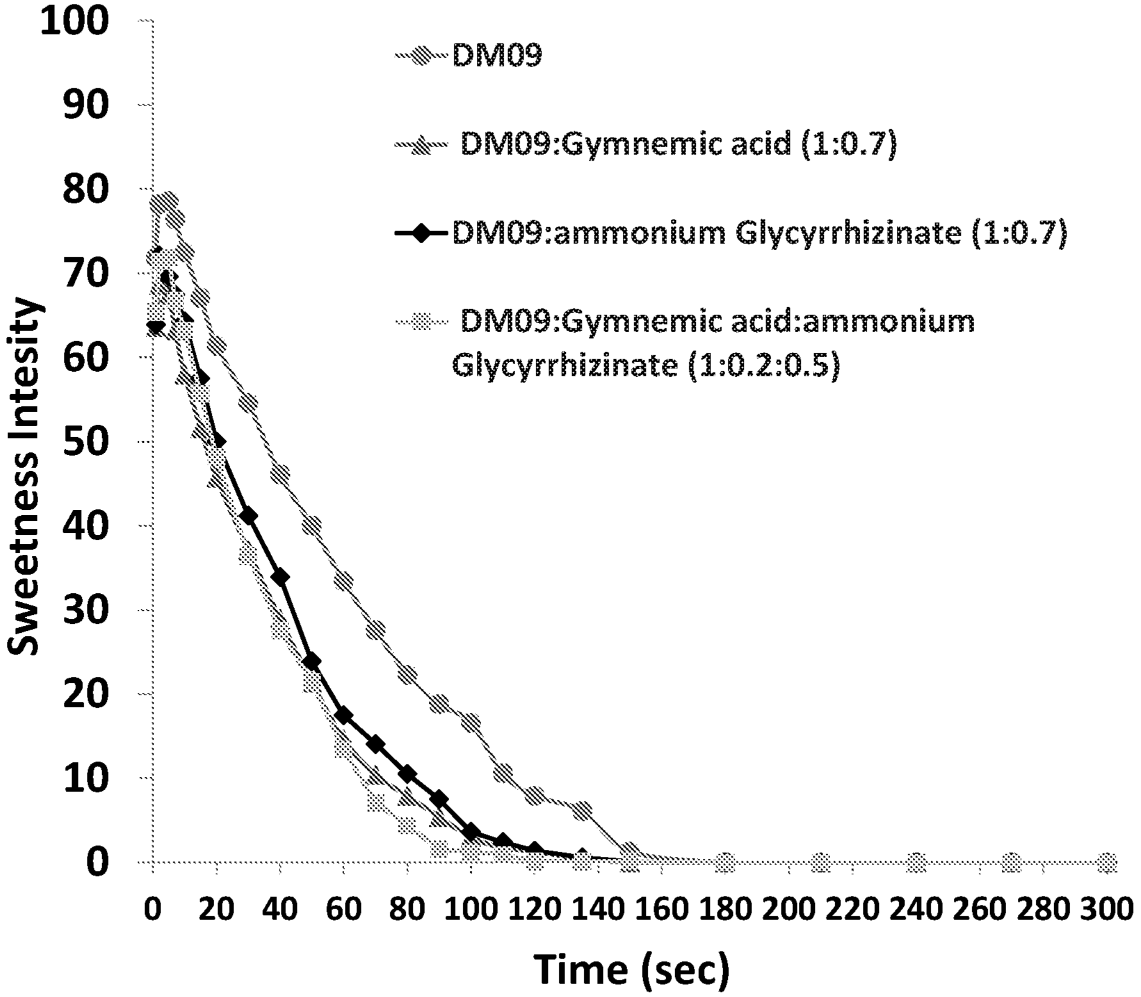
FIG. 13 shows the effect of the combination of Gymnemic acids and Ammonium Glycyrrhizinate compared to each additive on its own at same total additive concentration, with DM09, compared to DM09 alone, at 8 Bx sugar equivalence level, on sweetness profile over time.

FIG. 13 shows the effect of the combination of gymnemic acids and ammonium glycyrrhizinate compared to each additive on its own at same total additive concentration, with DM09, compared to DM09 alone, at 8 Bx sugar equivalence level, on sweetness profile over time. The combination is synergistic as it is more effective than each compound alone at same total additive concentration.

Figure 14:
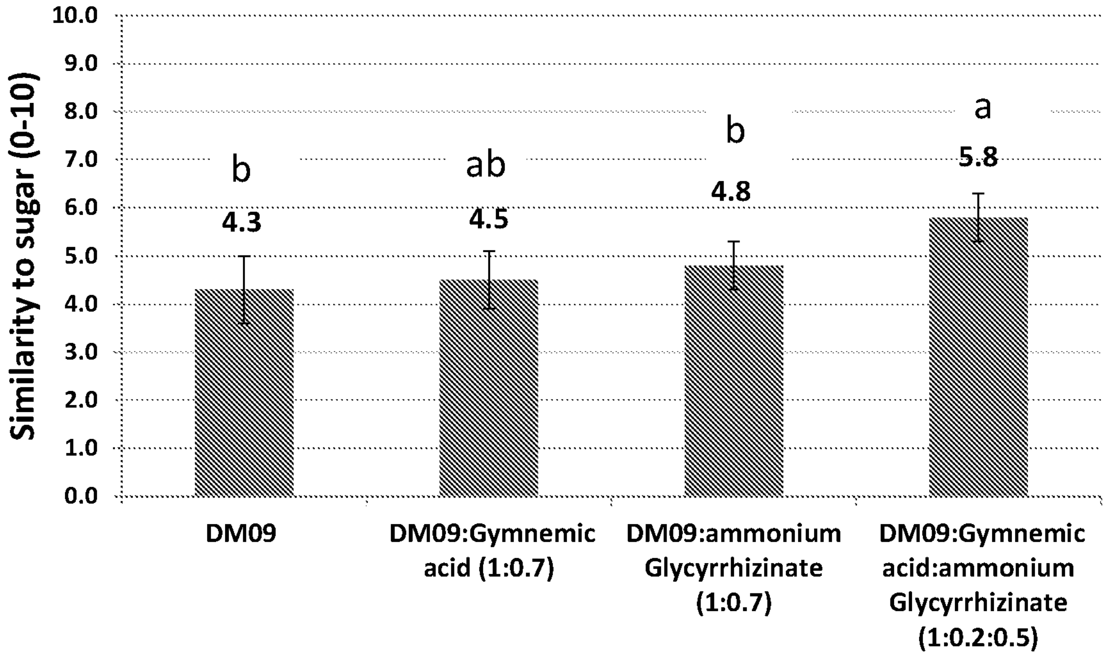
FIG. 14 shows the effect of the combination of Gymnemic acids and Ammonium Glycyrrhizinate compared to each additive on its own at same total additive concentration, with DM09, compared to DM09 alone, at 8 Bx sugar equivalence level, on the qualitative similarity of the taste to that of sugar. Different letters indicate significantly different result (P<0.05). For example, DM09:Gymnemic acid:ammonium Glycyrrhizinate is significantly more similar to sugar compared to DM09 alone, because it has different letters.

FIG. 14 shows the effect of the combination of gymnemic acids and ammonium glycyrrhizinate compared to each additive on its own at same total additive concentration, with DM09, compared to DM09 alone, at 8 Bx sugar equivalence level, on the qualitative similarity of the taste to that of sugar. Different letters indicate significantly different result ($P<0.05$).

As demonstrated, *Quillaja* saponin extract, Gymnemic acids and Mono Ammonium Glycyrrhizinate or with MD, or combinations thereof improved the sweetness intensity of DM09 by decreasing the lingering effect and making the sweetness better resemble the temporal sweetness profile of sugar.

Example 3: Formulation Composed of DM09, Lactisole, Tannic Acid, and Mono-Ammonium Glycyrrhizinate The formulation composed of DM09, lactisole, tannic acid, and MAG was prepared as follows: Stock solutions of the different ingredients were prepared. Lactisole and tannic acid at a concentration of 5 mg/ml were prepared in water. While stock solutions of DM09 and MAG at a concentration of 5 mg/ml were prepared in citrate buffer at a pH of 6.0. The formulation was prepared by mixing DM09 with the various ingredients at the specified ratio and diluted to the drinking level of DM09 (0.02 mg/ml) in citrate buffer at a pH of 3.6.

Figure 16:
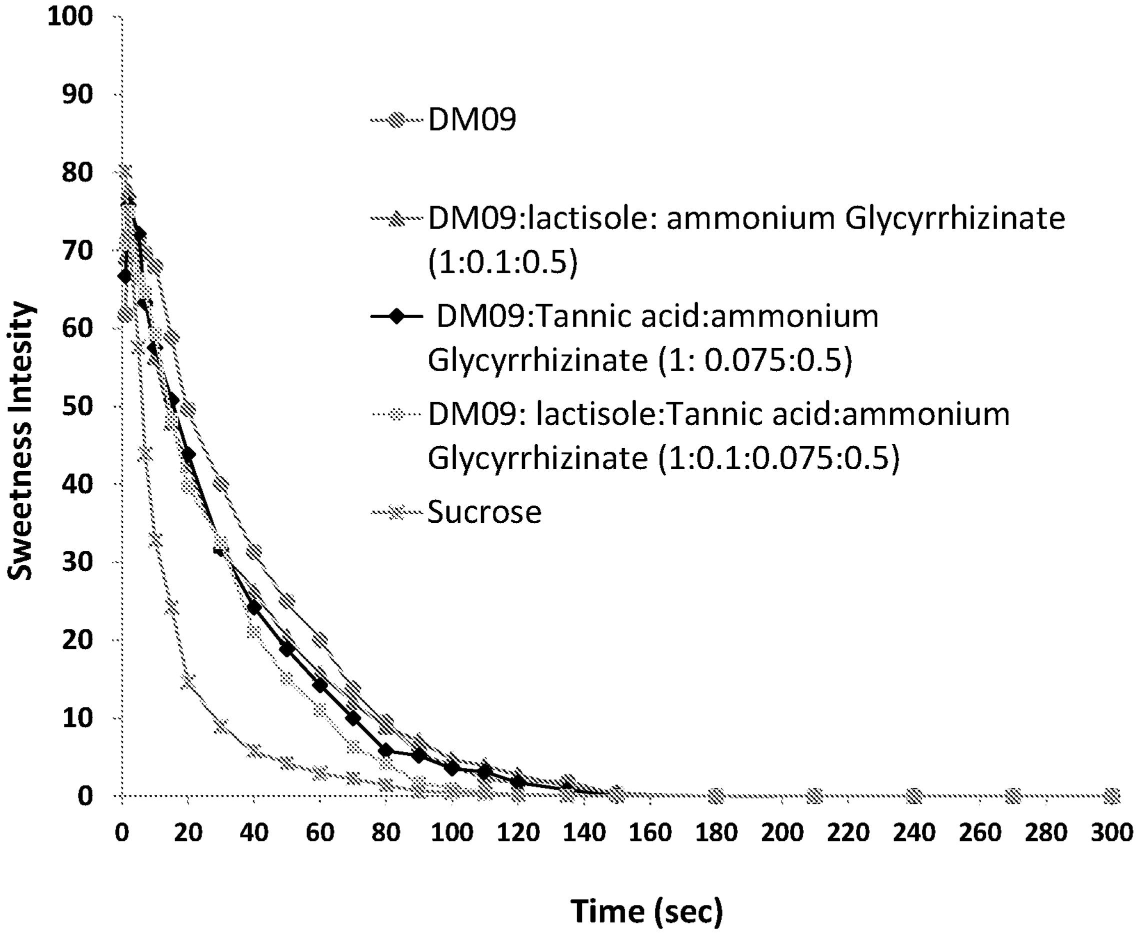
FIG. 16 shows improved sweetness-intensity-vs.-time curve of a sweet protein (SP) by tannic acid and ammonium glycyrrhizinate, or by lactisole and ammonium glycyrrhizinate, or by lactisole tannic acid and ammonium glycyrrhizinate.

FIG. 16 shows the effect of the different formulations containing combinations of MAG, tannic acid, or lactisole compared to DM09 alone. The first formulation was composed of DM09, tannic acid, and MAG at a ratio of 1:0.075:0.5 (w/w), respectively. The second formulation was composed of DM09, lactisole, and MAG at a ratio of 1:0.1:0.5 (w/w), respectively. While the third one with the most significant effect compared to DM09 alone is composed of DM09, lactisole, tannic acid, and MAG at a ratio of 1:0.1:0.075:0.5, respectively.

Figure 17:
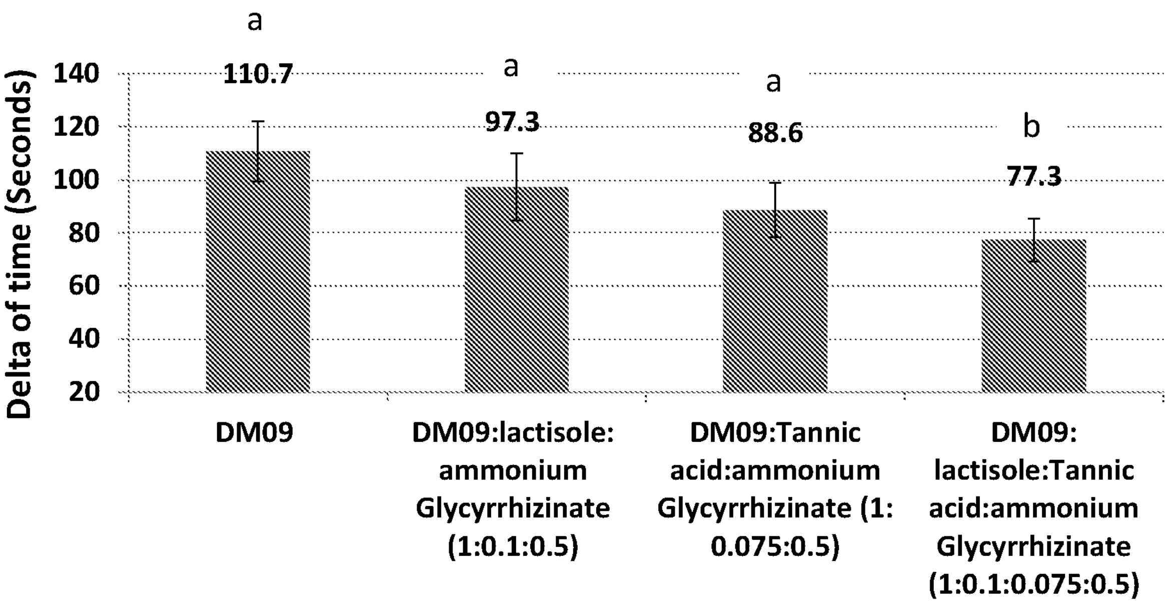
FIG. 17 shows the effect of the combination of lactisole and ammonium glycyrrhizinate, or tannic acid and ammonium glycyrrhizinate, or lactisole tannic acid and ammonium glycyrrhizinate with DM09, compared to DM09 alone, at 8 Bx sugar equivalence level on linger time (Delta time). Different letters indicate significantly different result ($P<0.05$). For example, the delta time of DM09 is significantly higher than the delta time of DM09:lactisole:tannic acid:ammonium Glycyrrhizinate because it has different letters.

FIG. 17 demonstrates the effect of the different formulations containing combinations of MAG, tannic acid, or lactisole compared to DM09 alone, at 8 Bx sugar equivalence level:Delta time (in a sec) from initial to 0 sweetness intensity. The combined MAG, tannic acid and lactisole gave a significantly shorter linger (delta time) while even slightly increasing the maximal sweetness.

Example 4: Meta Analysis Results of EGCG and Licorice as MP Agents for Designer Monellin 9 (DM09)

The meta-analysis was based on 44 sensory panel meetings and 55 MP agents. Statistical analysis was conducted. Four measures of lingering were defined:

- AUC—the area under the time-intensity curve from 60 seconds to 300 seconds.
- I60/max—the ratio between the intensity recorded at 60 seconds and the maximum intensity recorded.
- T50—the time in seconds at which intensity recorded was 50% of the maximal intensity recorded
- T10—the time in seconds at which intensity recorded was 10% of the maximal intensity recorded The data for these parameters is presented in FIGS. 7-10. Each graph refers to a single parameter. The graphs show means and standard errors for the MP agents that show significant improvement compared to the control (DM09 alone). The standard errors are calculated according to all the data in the Meta analysis (including data that are not shown in the graph).

The mean for the protein without MP agents is colored black. Bars colored gray indicate MP agents which gave significantly less lingering ($p<0.05$) than the product without MP agents (control).

Figure 7:
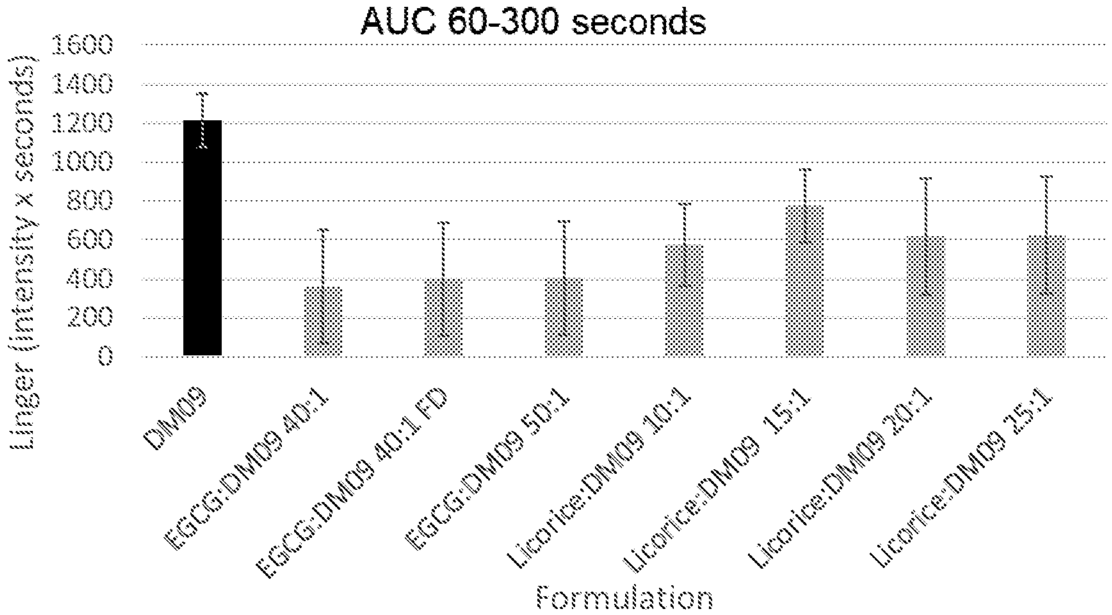
FIG. 7 shows the Linger (AUC of the sweetness-intensity vs. time, in the range of 60-300 seconds) of EGCG:DM09 (40:1) fresh vs. freeze-dried (FD), EGCG:DM09 (50:1) fresh and of licorice extract at 10:1, 15:1, 20:1 and 25:1 with DM09 compared to DM09 alone.

FIG. 7 shows EGCG:DM09 (40:1) fresh vs. freeze-dried (FD), EGCG:DM09 (50:1) fresh and of Licorice extract at 10:1, 15:1, 20:1 and 25:1 with DM09, compared to DM09 alone on linger (AUC 60-300 sec). It is evident that both fresh and freeze dried EGCG:DM09 (40:1) gave significantly ($P<0.05$) lower linger compared to DM09 alone. Also the other formulations presented gave statistically significant lowering of the linger compared to DM09 alone.

Figure 8:
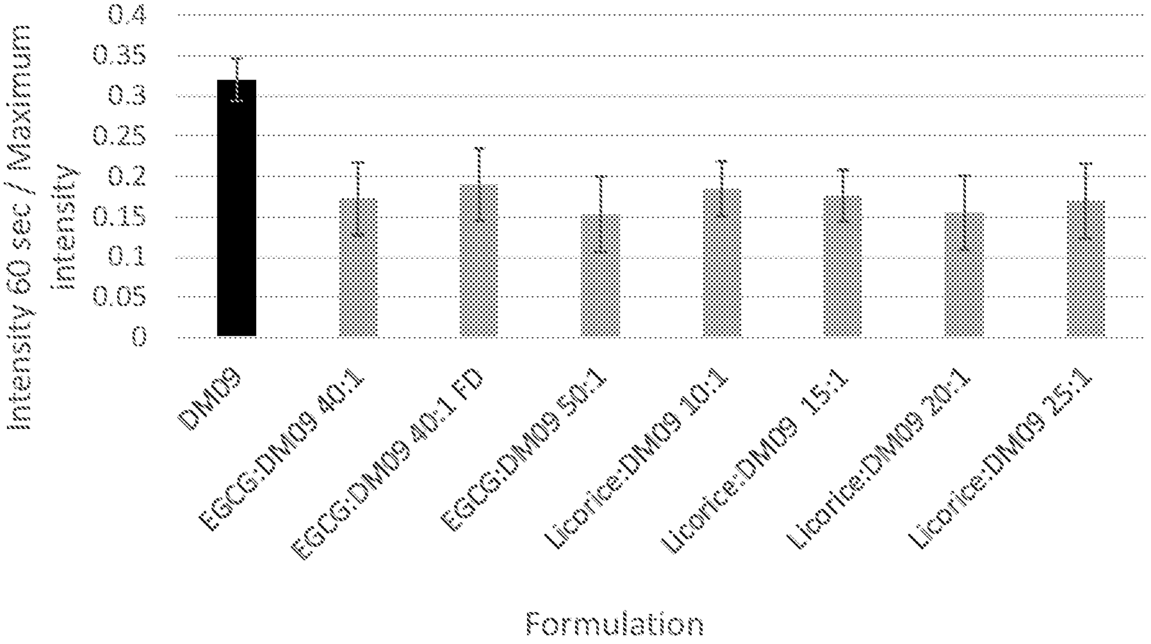
FIG. 8 shows the ratio of intensity at 60 sec/maximal intensity of EGCG:DM09 (40:1) freeze-dried (FD), EGCG:DM09 (50:1) fresh, and of licorice extract at 10:1, 15:1, 20:1 and 25:1 with DM09, compared to DM09 alone.

FIG. 8 shows EGCG:DM09 (40:1) fresh vs. freeze-dried (FD), EGCG:DM09 (50:1) fresh, and of Licorice extract at 10:1, 15:1, 20:1 and 25:1 with DM09, compared to DM09 alone on linger (Intensity at 60 sec/maximal intensity). Also this parameter indicates a statistically significant ($p<0.05$) improvement of the linger for all presented formulations.

Figure 9:
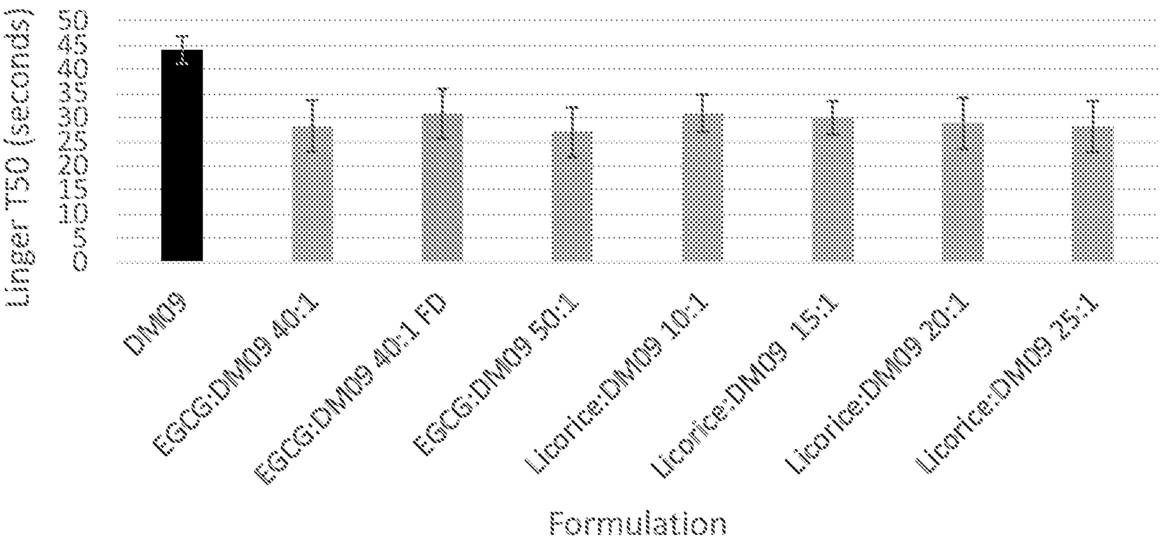
FIG. 9 shows the effect on Linger T50 (Time (sec) to 50% of the maximal intensity) of EGCG:DM09 (40:1) fresh vs. freeze-dried (FD), EGCG:DM09 (50:1) fresh, and of Licorice extract at 10:1, 15:1, 20:1 and 25:1 with DM09, compared to DM09 alone.

FIG. 9 shows EGCG:DM09 (40:1) fresh vs. freeze-dried (FD), EGCG:DM09 (50:1) fresh, and of Licorice extract at 10:1, 15:1, 20:1 and 25:1 with DM09, compared to DM09 alone on linger (time (sec) to 50% of the maximal intensity). Also this parameter indicates a statistically significant ($p<0.05$) improvement of the linger for all presented formulations.

Figure 10:
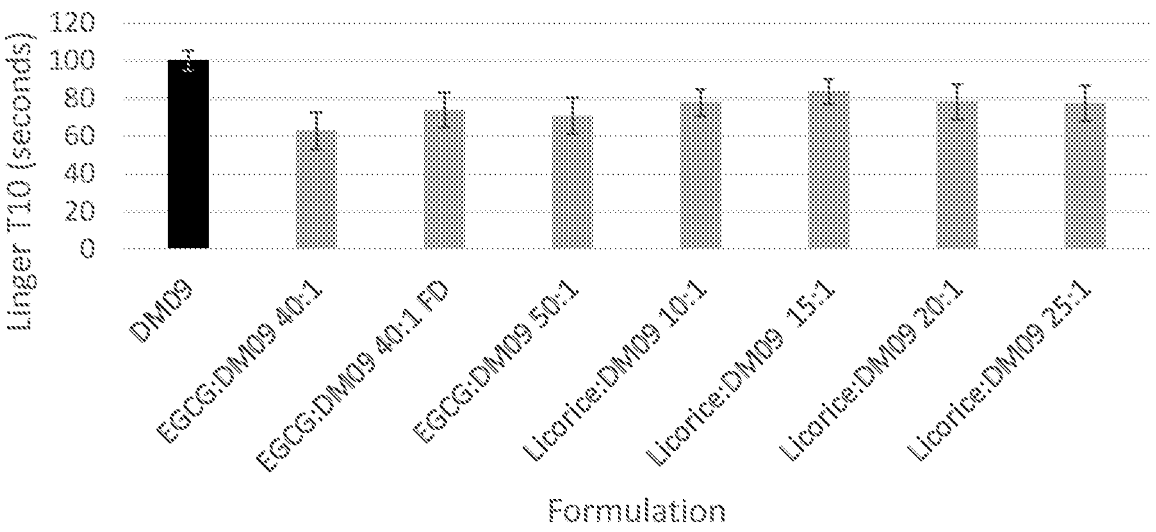
FIG. 10 shows the effect of EGCG:DM09 (40:1) fresh vs. freeze-dried (FD), EGCG:DM09 (50:1) fresh, and of Licorice extract at 10:1, 15:1, 20:1 and 25:1 with DM09, compared to DM09 alone on linger (time (sec) to 10% of the maximal intensity).

FIG. 10 shows EGCG:DM09 (40:1) fresh vs. freeze-dried (FD), EGCG:DM09 (50:1) fresh, and of Licorice extract at 10:1, 15:1, 20:1 and 25:1 with DM09, compared to DM09 alone on linger (time (sec) to 10% of the maximal intensity). Also this parameter indicates a statistically significant ($p<0.05$) improvement of the linger for all presented formulations.

As demonstrated, Licorice and EGCG improved the sweetness profile of DM09 by decreasing the lingering effect and making the sweetness better resemble the temporal sweetness profile of sugar.

Example 5: Results of Encapsulation and Triggered Release of an Antisweat MP Agent to Improve Sweetness Profile of Designer Monellin 9 (DM09)

To inhibit the linger without diminishing the sweetness onset and potency, we encapsulated an anti-sweet agent in MD, so that it would be released (apparently by enzymatic breakdown of the MD) shortly after ingestion, thereby exerting a delayed suppression of the sweetness to shorten the linger.

Figure 15:
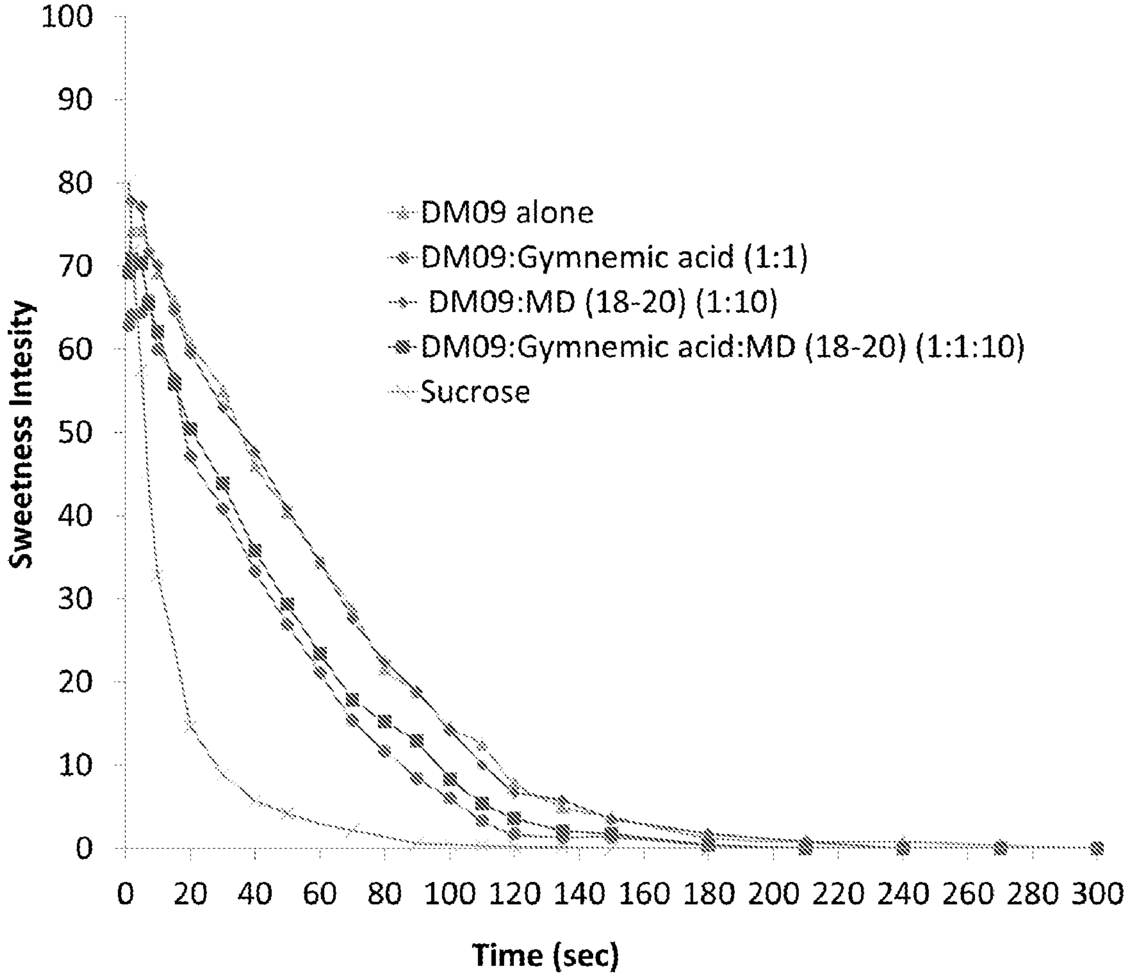
FIG. 15 shows improved sweetness-intensity-vs.-time curve of a sweet protein (SP) by Gymnemic acids (GA) entrapped in maltodextrin (MD), which is known to be enzymatically degraded by amylase in the saliva, apparently inducing triggered, or activated release of GA upon ingestion to inhibit the SP linger. Notice the longest linger time is that of the SP alone. GA decreases the linger but also the maximal intensity, while the SP with MD-encapsulated ASA (GA) has a higher maximal intensity than the SP with GA only, and shorter linger than the SP alone or SP with MD.

FIG. 15 shows improved sweetness-intensity-vs.-time curve of a sweet protein (SP) by gymnemic acids (an ASA) entrapped in MD, which is known to be enzymatically degraded by amylase in the saliva, apparently inducing triggered, or activated release of gymnemic acid upon ingestion to inhibit the SP linger. Notice the longest linger time is that of the SP alone. gymnemic acid decreases the linger but also the maximal intensity, while the SP with MD-encapsulated ASA (gymnemic acid) has a higher maximal intensity than the SP with gymnemic acid only, and shorter linger than the SP alone or SP with MD.

Based on these results, one can conclude that the “micro-patching” (MP) technology shows good promise to improve the performance of sweet proteins.

The invention claimed is:

1. A functional taste-improving composition comprising at least one taste-modifying protein (TMP) and at least one micropatching (MP) agent, wherein the TMP is a modified single chain Monellin (MNEI) comprising an amino acid sequence selected from the group consisting of SEQ ID NOs: 1-27, or a fragment or variant thereof, and wherein the MP agent is a tannin and/or a catechin, wherein said tannin is tannic acid and the ratio between the TMP and the tannic acid is between 1:5 and 1:10, and wherein the catechin is epigallocatechin-3-gallate (EGCG) and the ratio between the TMP and the EGCG is between 1:40 and 1:60.

2. The functional taste-improving composition, according to claim 1, wherein the at least one MP agent interacts with (i) the at least one TMP or (ii) at least one sweet taste receptor.

3. The functional taste-improving composition, according to claim 1, wherein the at least one MP agent further comprises gymnemic acid, ziziphin, hodulcine, licorice, ammonium glycyrrhizinate, glycyrrhizic acid, ammoniated glycyrrhizin, dipotassium glycyrrhizinate, monoammonium glycyrrhizinate, stearyl glycyrrhizinate, or a mixture thereof.

4. The functional taste-improving composition, according to claim 1, wherein the at least one MP agent is encapsulated, entrapped, or coated partly or fully, optionally wherein the at least one MP agent is released during oral processing.

5. The functional taste-improving composition, according to claim 4, wherein the encapsulating, entrapping or coating of the MP agent is by maltodextrin or cyclodextrin which electrostatically binds to the MP agent, optionally wherein the maltodextrin or cyclodextrin electrostatically binds to the MP agent at a pH range below 6.2, or above 7.6, and is repulsed from the MP agent at a pH range of about 6.2 to about 7.6.

6. The functional taste-improving composition, according to claim 4, wherein the encapsulating or coating material is a food compound with a melting point ranging from about 25° C. to about 35° C.

7. The functional taste-improving composition, according to claim 1, wherein the functional taste-improving composition has at least one improved food-related property compared with the TMP alone, optionally wherein the at least one improved food-related property is selected from the group consisting of better sweetness profile, shortened sweet taste onset, shortened sweet taste lingering, better sweetness potency, better sweetness kinetics, increased thermal stability, high pressure stability, increased pH stability, decreased binding to hydrophobic regions, improved freeze-thaw stability, improved reconstitutability after drying, increased solubility, a sensory profile that is closer to that of sugar and increased shelf-life stability in dry form or in the final product.

8. A product for oral delivery comprising the functional taste-improving composition, according to claim 1 optionally wherein the product is a food or beverage product, a dietary supplement product, or a medicament.

9. The functional taste-improving composition, according to claim 1, for use as a sweetener.

10. A food or beverage product comprising the functional taste-improving composition, according to claim 1, optionally comprising at least one additional food ingredient.

11. The food or beverage product, according to claim 10, wherein the food ingredient is (i) at least one of flavor, food additive, food coloring, preservative, or sweetness enhancer; or (ii) selected from the group consisting of *stevia*, sucrose, fructose, glucose, agave nectar, brown rice syrup, date sugar, honey, maple syrup, molasses, steviol glycosides, rebaudioside, monk fruit, sugar alcohols, rare sugars, aspartame, sucralose, acesulfame potassium, saccharin, neotame, advantame, maltodextrin, oligosaccharides, and dietary fibers.

12. The food or beverage product, according to claim 10, wherein the food or beverage product has low glycemic effects and is in the form of liquid or solid foodstuffs.

13. The functional taste-improving composition, according to claim 1, wherein the composition has a reduced sweet lingering aspect than that of the TMP without the MP agent.

14. A method for improving the flavor or masking the lingering aftertaste of beverage or solid foodstuffs, comprising adding a sufficient amount of the composition of claim 1 to the beverage or solid foodstuffs.

15. The functional taste-improving composition, according to claim 1, wherein the MNEI comprises an amino acid sequence SEQ ID NO: 3 or a fragment or variant thereof.

* * * * *

SEQUENCE LISTING

<160> NUMBER OF SEQ ID NOS: 28

<210> SEQ ID NO 1
<211> LENGTH: 96
<212> TYPE: PRT
<213> ORGANISM: Artificial Sequence
<220> FEATURE:
<223> OTHER INFORMATION: Synthetic

<400> SEQUENCE: 1

```
Gly Asn Trp Glu Ile Ile Asp Thr Gly Pro Phe Thr Gln Lys Leu Gly
1               5                   10                  15

Lys Phe Ala Val Asp Glu Ala Asn Lys Ile Gly Lys Tyr Gly Thr Leu
            20                  25                  30

Thr Phe Thr Lys Val Ile Arg Pro Thr Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Lys Ala Asn Asp Lys Leu Phe Arg Ala Asp Ile Ser Glu Asp Tyr Lys
65                  70                  75                  80

Thr Arg Gly Leu Lys Leu Leu Arg Phe Asn Gly Pro Val Pro Pro Pro
                85                  90                  95
```

<210> SEQ ID NO 2
<211> LENGTH: 96
<212> TYPE: PRT
<213> ORGANISM: Artificial Sequence
<220> FEATURE:
<223> OTHER INFORMATION: Synthetic

<400> SEQUENCE: 2

```
Gly Asn Trp Glu Ile Ile Asp Ile Gly Pro Phe Thr Gln Asn Leu Gly
1               5                   10                  15

Lys Phe Ala Val Asp Glu Val Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Lys Ala Ser Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95
```

<210> SEQ ID NO 3
<211> LENGTH: 96
<212> TYPE: PRT
<213> ORGANISM: Artificial Sequence
<220> FEATURE:
<223> OTHER INFORMATION: Synthetic

<400> SEQUENCE: 3

```
Gly Asn Trp Glu Ile Ile Asp Ile Gly Pro Phe Thr Gln Asn Leu Gly
1               5                   10                  15

Lys Phe Ala Val Asp Glu Ala Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60
```

```
Arg Ala Ser Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 4
<211> LENGTH: 96
<212> TYPE: PRT
<213> ORGANISM: Artificial Sequence
<220> FEATURE:
<223> OTHER INFORMATION: Synthetic

<400> SEQUENCE: 4

Gly Glu Trp Glu Ile Ile Asp Ile Gly Pro Phe Thr Gln Asn Leu Gly
1               5                   10                  15

Lys Phe Ala Val Asp Glu Glu Asn Lys Ile Gly Lys Tyr Gly Thr Leu
            20                  25                  30

Thr Phe Thr Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Tyr Ala Asn Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 5
<211> LENGTH: 96
<212> TYPE: PRT
<213> ORGANISM: Artificial Sequence
<220> FEATURE:
<223> OTHER INFORMATION: Synthetic

<400> SEQUENCE: 5

Gly Glu Trp Glu Ile Ile Asp Thr Gly Pro Phe Thr Gln Lys Leu Gly
1               5                   10                  15

Lys Phe Ala Val Asp Glu Glu Asn Lys Ile Gly Gln Tyr Gly Arg Leu
            20                  25                  30

Thr Phe Asn Lys Val Ile Arg Pro Thr Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Tyr Ala Ser Asp Lys Leu Phe Arg Ala Asp Ile Ser Glu Asp Tyr Lys
65                  70                  75                  80

Thr Arg Gly Leu Lys Leu Leu Arg Phe Asn Gly Pro Val Pro Pro Pro
                85                  90                  95


<210> SEQ ID NO 6
<211> LENGTH: 96
<212> TYPE: PRT
<213> ORGANISM: Artificial Sequence
<220> FEATURE:
<223> OTHER INFORMATION: Synthetic

<400> SEQUENCE: 6

Gly Glu Trp Glu Ile Ile Asp Thr Gly Pro Phe Thr Gln Asn Leu Gly
1               5                   10                  15

Lys Phe Ala Val Asp Glu Glu Asn Lys Ile Gly Gln Tyr Gly Arg Leu
            20                  25                  30
```

```
Thr Phe Asn Lys Val Ile Arg Pro Thr Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Tyr Ala Ser Asp Lys Leu Phe Arg Ala Asp Ile Ser Glu Asp Tyr Lys
65                  70                  75                  80

Thr Arg Gly Leu Lys Leu Leu Arg Phe Asn Gly Pro Val Pro Pro Pro
                85                  90                  95


<210> SEQ ID NO 7
<211> LENGTH: 96
<212> TYPE: PRT
<213> ORGANISM: Artificial Sequence
<220> FEATURE:
<223> OTHER INFORMATION: Synthetic

<400> SEQUENCE: 7

Gly Asn Trp Glu Ile Ile Asp Ile Gly Pro Phe Thr Gln Asn Leu Gly
1               5                   10                  15

Lys Phe Ala Val Asp Glu Val Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Lys Ala Ser Asp Lys Ile Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 8
<211> LENGTH: 96
<212> TYPE: PRT
<213> ORGANISM: Artificial Sequence
<220> FEATURE:
<223> OTHER INFORMATION: Synthetic

<400> SEQUENCE: 8

Gly Asn Trp Glu Ile Ile Asp Ile Gly Pro Phe Thr Gln Asn Leu Gly
1               5                   10                  15

Lys Phe Ala Val Asp Glu Ala Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Arg Ala Ser Asp Lys Ile Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 9
<211> LENGTH: 96
<212> TYPE: PRT
<213> ORGANISM: Artificial Sequence
<220> FEATURE:
<223> OTHER INFORMATION: Synthetic
```

<400> SEQUENCE: 9

Gly Asn Trp Glu Ile Ile Asp Ile Gly Pro Phe Thr Gln Asn Leu Gly
1 5 10 15

Lys Phe Ala Val Asp Glu Glu Asn Lys Ile Gly Gln Tyr Gly Arg Leu
20 25 30

Thr Phe Asn Lys Val Ile Arg Pro Cys Met Lys Lys Thr Ile Tyr Glu
35 40 45

Asn Glu Gly Phe Arg Glu Ile Lys Gly Tyr Glu Tyr Gln Leu Tyr Val
50 55 60

Lys Ala Ser Asp Lys Ile Phe Arg Ala Asp Ile Ser Glu Asp Tyr Lys
65 70 75 80

Thr Arg Gly Arg Lys Leu Leu Arg Phe Asn Gly Pro Val Pro Pro Pro
85 90 95

<210> SEQ ID NO 10
<211> LENGTH: 96
<212> TYPE: PRT
<213> ORGANISM: Artificial Sequence
<220> FEATURE:
<223> OTHER INFORMATION: Synthetic

<400> SEQUENCE: 10

Gly Asn Trp Glu Ile Ile Asp Ile Gly Pro Phe Thr Gln Asn Leu Gly
1 5 10 15

Lys Phe Ala Val Asp Glu Val Asn Lys Ile Gly Gln Tyr Gly Arg Leu
20 25 30

Thr Phe Asn Thr Val Ile Arg Pro Cys Met Lys Lys Thr Ile Tyr Glu
35 40 45

Asn Glu Gly Phe Arg Glu Ile Lys Gly Tyr Glu Tyr Gln Leu Tyr Val
50 55 60

Lys Ala Ser Asp Lys Ile Phe Arg Ala Asp Ile Ser Glu Asp Tyr Lys
65 70 75 80

Thr Arg Gly Arg Lys Leu Leu Arg Phe Asn Gly Pro Val Pro Pro Pro
85 90 95

<210> SEQ ID NO 11
<211> LENGTH: 96
<212> TYPE: PRT
<213> ORGANISM: Artificial Sequence
<220> FEATURE:
<223> OTHER INFORMATION: Synthetic

<400> SEQUENCE: 11

Gly Asn Trp Glu Ile Ile Asp Ile Gly Pro Phe Thr Gln Asn Leu Gly
1 5 10 15

Lys Phe Ala Val Asp Glu Ala Asn Lys Ile Gly Gln Tyr Gly Arg Leu
20 25 30

Thr Phe Asn Thr Val Ile Arg Pro Cys Met Lys Lys Thr Ile Tyr Glu
35 40 45

Asn Glu Gly Phe Arg Glu Ile Lys Gly Tyr Glu Tyr Gln Leu Tyr Val
50 55 60

Arg Ala Ser Asp Lys Ile Phe Arg Ala Asp Ile Ser Glu Asp Tyr Lys
65 70 75 80

Thr Arg Gly Arg Lys Leu Leu Arg Phe Asn Gly Pro Val Pro Pro Pro
85 90 95

<210> SEQ ID NO 12

<211> LENGTH: 96
<212> TYPE: PRT
<213> ORGANISM: Artificial Sequence
<220> FEATURE:
<223> OTHER INFORMATION: Synthetic

<400> SEQUENCE: 12

Gly Asn Trp Glu Ile Ile Asp Ile Gly Pro Phe Thr Gln Asn Leu Gly
1 5 10 15

Lys Phe Ala Val Asp Glu Glu Asn Lys Ile Gly Gln Tyr Gly Arg Leu
20 25 30

Thr Phe Asn Thr Val Ile Arg Pro Cys Met Lys Lys Thr Ile Tyr Glu
35 40 45

Asn Glu Gly Phe Arg Glu Ile Lys Gly Tyr Glu Tyr Gln Leu Tyr Val
50 55 60

Lys Ala Ser Asp Lys Ile Phe Arg Ala Asp Ile Ser Glu Asp Tyr Lys
65 70 75 80

Thr Arg Gly Arg Lys Leu Leu Arg Phe Asn Gly Pro Val Pro Pro Pro
85 90 95

<210> SEQ ID NO 13
<211> LENGTH: 96
<212> TYPE: PRT
<213> ORGANISM: Artificial Sequence
<220> FEATURE:
<223> OTHER INFORMATION: Synthetic

<400> SEQUENCE: 13

Gly Asn Trp Glu Ile Ile Asp Ile Gly Pro Phe Thr Gln Asn Leu Gly
1 5 10 15

Lys Phe Ala Val Asp Glu Ala Asn Lys Ile Gly Gln Tyr Gly Arg Leu
20 25 30

Thr Phe Thr Thr Val Ile Arg Pro Cys Met Lys Lys Thr Ile Tyr Glu
35 40 45

Asn Glu Gly Phe Arg Glu Ile Lys Gly Tyr Glu Tyr Gln Leu Tyr Val
50 55 60

Arg Ala Ser Asp Lys Ile Phe Arg Ala Asp Ile Ser Glu Asp Tyr Lys
65 70 75 80

Thr Arg Gly Arg Lys Leu Leu Arg Phe Asn Gly Pro Val Pro Pro Pro
85 90 95

<210> SEQ ID NO 14
<211> LENGTH: 96
<212> TYPE: PRT
<213> ORGANISM: Artificial Sequence
<220> FEATURE:
<223> OTHER INFORMATION: Synthetic

<400> SEQUENCE: 14

Gly Asn Trp Glu Ile Ile Asp Ile Gly Pro Phe Thr Gln Asn Leu Gly
1 5 10 15

Lys Phe Ala Val Asp Glu Glu Asn Lys Ile Gly Gln Tyr Gly Arg Leu
20 25 30

Thr Phe Thr Thr Val Ile Arg Pro Cys Met Lys Lys Thr Ile Tyr Glu
35 40 45

Asn Glu Gly Phe Arg Glu Ile Lys Gly Tyr Glu Tyr Gln Leu Tyr Val
50 55 60

Arg Ala Ser Asp Lys Ile Phe Arg Ala Asp Ile Ser Glu Asp Tyr Lys
65 70 75 80

Thr Arg Gly Arg Lys Leu Leu Arg Phe Asn Gly Pro Val Pro Pro Pro
85 90 95

<210> SEQ ID NO 15
<211> LENGTH: 96
<212> TYPE: PRT
<213> ORGANISM: Artificial Sequence
<220> FEATURE:
<223> OTHER INFORMATION: Synthetic

<400> SEQUENCE: 15

Gly Glu Trp Glu Ile Ile Asp Ile Gly Pro Phe Thr Gln Asn Leu Gly
1 5 10 15

Lys Phe Ala Val Asp Glu Glu Asn Lys Ile Gly Gln Tyr Gly Arg Leu
20 25 30

Thr Phe Thr Thr Val Ile Arg Pro Cys Met Lys Lys Thr Ile Tyr Glu
35 40 45

Asn Glu Gly Phe Arg Glu Ile Lys Gly Tyr Glu Tyr Gln Leu Tyr Val
50 55 60

Arg Ala Ser Asp Lys Ile Phe Arg Ala Asp Ile Ser Glu Asp Tyr Lys
65 70 75 80

Thr Arg Gly Arg Lys Leu Leu Arg Phe Asn Gly Pro Val Pro Pro Pro
85 90 95

<210> SEQ ID NO 16
<211> LENGTH: 96
<212> TYPE: PRT
<213> ORGANISM: Artificial Sequence
<220> FEATURE:
<223> OTHER INFORMATION: Synthetic

<400> SEQUENCE: 16

Gly Asn Trp Glu Ile Ile Asp Ile Gly Pro Phe Thr Gln Asn Leu Gly
1 5 10 15

Lys Phe Ala Val Asp Glu Glu Asn Lys Ile Gly Gln Tyr Gly Arg Leu
20 25 30

Thr Phe Asn Thr Val Ile Arg Pro Cys Met Lys Lys Thr Ile Tyr Glu
35 40 45

Asn Glu Gly Phe Arg Glu Ile Lys Gly Tyr Glu Tyr Gln Leu Tyr Val
50 55 60

Arg Ala Ser Asp Lys Ile Phe Arg Ala Asp Ile Ser Glu Asp Tyr Lys
65 70 75 80

Thr Arg Gly Arg Lys Leu Leu Arg Phe Asn Gly Pro Val Pro Pro Pro
85 90 95

<210> SEQ ID NO 17
<211> LENGTH: 96
<212> TYPE: PRT
<213> ORGANISM: Artificial Sequence
<220> FEATURE:
<223> OTHER INFORMATION: Synthetic

<400> SEQUENCE: 17

Gly Glu Trp Glu Ile Ile Asp Ile Gly Pro Phe Thr Gln Asn Leu Gly
1 5 10 15

Lys Phe Ala Val Asp Glu Glu Asn Lys Ile Gly Gln Tyr Gly Arg Leu
20 25 30

Thr Phe Asn Thr Val Ile Arg Pro Cys Met Lys Lys Thr Ile Tyr Glu
35 40 45

```
Asn Glu Gly Phe Arg Glu Ile Lys Gly Tyr Glu Tyr Gln Leu Tyr Val
    50                  55                  60

Arg Ala Ser Asp Lys Ile Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 18
<211> LENGTH: 96
<212> TYPE: PRT
<213> ORGANISM: Artificial Sequence
<220> FEATURE:
<223> OTHER INFORMATION: Synthetic

<400> SEQUENCE: 18

Gly Asn Trp Glu Ile Ile Asp Ile Gly Pro Phe Thr Gln Asn Leu Gly
1               5                   10                  15

Lys Phe Ala Val Asp Glu Ala Asn Lys Ile Gly Gln Tyr Gly Arg Leu
            20                  25                  30

Thr Phe Thr Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Arg Ala Ser Asp Lys Ile Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 19
<211> LENGTH: 96
<212> TYPE: PRT
<213> ORGANISM: Artificial Sequence
<220> FEATURE:
<223> OTHER INFORMATION: Synthetic

<400> SEQUENCE: 19

Gly Asn Trp Glu Ile Ile Asp Ile Gly Pro Phe Thr Gln Asn Leu Gly
1               5                   10                  15

Lys Phe Ala Val Asp Glu Ile Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Arg Ala Ser Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 20
<211> LENGTH: 96
<212> TYPE: PRT
<213> ORGANISM: Artificial Sequence
<220> FEATURE:
<223> OTHER INFORMATION: Synthetic

<400> SEQUENCE: 20

Gly Glu Trp Glu Ile Ile Asp Ile Gly Pro Phe Thr Gln Asn Leu Gly
1               5                   10                  15
```

```
Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Arg Ala Ser Asp Lys Ile Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 21
<211> LENGTH: 96
<212> TYPE: PRT
<213> ORGANISM: Artificial Sequence
<220> FEATURE:
<223> OTHER INFORMATION: Synthetic

<400> SEQUENCE: 21

Gly Asn Trp Glu Ile Ile Asp Ile Gly Pro Phe Thr Gln Asn Leu Gly
1               5                   10                  15

Lys Phe Ala Val Asp Glu Val Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Arg Ala Ser Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95


<210> SEQ ID NO 22
<211> LENGTH: 93
<212> TYPE: PRT
<213> ORGANISM: Artificial Sequence
<220> FEATURE:
<223> OTHER INFORMATION: Synthetic

<400> SEQUENCE: 22

Gly Asn Trp Glu Ile Ile Asp Ile Gly Pro Phe Thr Gln Asn Leu Gly
1               5                   10                  15

Lys Phe Ala Val Asp Glu Ala Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Gly Glu Ile Lys Gly Tyr Glu Tyr Gln Leu Tyr Val Arg Ala Ser
    50                  55                  60

Asp Lys Leu Phe Arg Ala Asp Ile Ser Glu Asp Tyr Lys Thr Arg Gly
65                  70                  75                  80

Arg Lys Leu Leu Arg Phe Asn Gly Pro Val Pro Pro Pro
                85                  90


<210> SEQ ID NO 23
<211> LENGTH: 93
<212> TYPE: PRT
<213> ORGANISM: Artificial Sequence
<220> FEATURE:
<223> OTHER INFORMATION: Synthetic
```

<400> SEQUENCE: 23

```
Gly Glu Trp Glu Ile Ile Asp Ile Gly Pro Phe Thr Gln Asn Leu Gly
1               5                   10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Gly Glu Ile Lys Gly Tyr Glu Tyr Gln Leu Tyr Val Tyr Ala Ser
    50                  55                  60

Asp Lys Leu Phe Arg Ala Asp Ile Ser Glu Asp Tyr Lys Thr Arg Gly
65                  70                  75                  80

Arg Lys Leu Leu Arg Phe Asn Gly Pro Val Pro Pro Pro
                85                  90
```

<210> SEQ ID NO 24
<211> LENGTH: 96
<212> TYPE: PRT
<213> ORGANISM: Artificial Sequence
<220> FEATURE:
<223> OTHER INFORMATION: Synthetic

<400> SEQUENCE: 24

```
Gly Asn Trp Glu Ile Ile Asp Ile Gly Pro Phe Thr Gln Asn Leu Gly
1               5                   10                  15

Lys Phe Ala Val Asp Glu Ile Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60

Arg Ala Ser Asp Lys Ile Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95
```

<210> SEQ ID NO 25
<211> LENGTH: 93
<212> TYPE: PRT
<213> ORGANISM: Artificial Sequence
<220> FEATURE:
<223> OTHER INFORMATION: Synthetic

<400> SEQUENCE: 25

```
Gly Asn Trp Glu Ile Ile Asp Ile Gly Pro Phe Thr Gln Asn Leu Gly
1               5                   10                  15

Lys Phe Ala Val Asp Glu Ala Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Gly Glu Ile Lys Gly Tyr Glu Tyr Gln Leu Tyr Val Arg Ala Ser
    50                  55                  60

Asp Lys Ile Phe Arg Ala Asp Ile Ser Glu Asp Tyr Lys Thr Arg Gly
65                  70                  75                  80

Arg Lys Leu Leu Arg Phe Asn Gly Pro Val Pro Pro Pro
                85                  90
```

<210> SEQ ID NO 26
<211> LENGTH: 93

<212> TYPE: PRT
<213> ORGANISM: Artificial Sequence
<220> FEATURE:
<223> OTHER INFORMATION: Synthetic

<400> SEQUENCE: 26

```
Gly Asn Trp Glu Ile Ile Asp Ile Gly Pro Phe Thr Gln Asn Leu Gly
1               5                   10                  15

Lys Phe Ala Val Asp Glu Val Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Gly Glu Ile Lys Gly Tyr Glu Tyr Gln Leu Tyr Val Lys Ala Ser
    50                  55                  60

Asp Lys Ile Phe Arg Ala Asp Ile Ser Glu Asp Tyr Lys Thr Arg Gly
65                  70                  75                  80

Arg Lys Leu Leu Arg Phe Asn Gly Pro Val Pro Pro Pro
                85                  90
```

<210> SEQ ID NO 27
<211> LENGTH: 93
<212> TYPE: PRT
<213> ORGANISM: Artificial Sequence
<220> FEATURE:
<223> OTHER INFORMATION: Synthetic

<400> SEQUENCE: 27

```
Gly Asn Trp Glu Ile Ile Asp Ile Gly Pro Phe Thr Gln Asn Leu Gly
1               5                   10                  15

Lys Phe Ala Val Asp Glu Val Asn Lys Ile Gly Gln Tyr Gly Arg Leu
            20                  25                  30

Thr Phe Asn Thr Val Ile Arg Pro Cys Met Lys Lys Thr Ile Tyr Glu
        35                  40                  45

Asn Gly Glu Ile Lys Gly Tyr Glu Tyr Gln Leu Tyr Val Lys Ala Ser
    50                  55                  60

Asp Lys Ile Phe Arg Ala Asp Ile Ser Glu Asp Tyr Lys Thr Arg Gly
65                  70                  75                  80

Arg Lys Leu Leu Arg Phe Asn Gly Pro Val Pro Pro Pro
                85                  90
```

<210> SEQ ID NO 28
<211> LENGTH: 96
<212> TYPE: PRT
<213> ORGANISM: Artificial Sequence
<220> FEATURE:
<223> OTHER INFORMATION: Synthetic

<400> SEQUENCE: 28

```
Gly Glu Trp Glu Ile Ile Asp Ile Gly Pro Phe Thr Gln Asn Leu Gly
1               5                   10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Gly Phe Arg Glu Ile Lys Gly Tyr Glu Tyr Gln Leu Tyr Val
    50                  55                  60
```

-continued

```
Tyr Ala Ser Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95
```